United States Patent
Imai et al.

(10) Patent No.: US 9,285,599 B2
(45) Date of Patent: Mar. 15, 2016

(54) THREE-DIMENSIONAL VIDEO VIEWING SYSTEM, DISPLAY SYSTEM, OPTICAL SHUTTER, AND THREE-DIMENSIONAL VIDEO VIEWING METHOD

(75) Inventors: Masao Imai, Tokyo (JP); Junichirou Ishii, Tokyo (JP); Goroh Saitoh, Tokyo (JP); Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 13/143,400

(22) PCT Filed: Jan. 19, 2010

(86) PCT No.: PCT/JP2010/050526
§ 371 (c)(1),
(2), (4) Date: Jul. 6, 2011

(87) PCT Pub. No.: WO2010/084849
PCT Pub. Date: Jul. 29, 2010

(65) Prior Publication Data
US 2011/0267442 A1 Nov. 3, 2011

(30) Foreign Application Priority Data
Jan. 22, 2009 (JP) .................. 2009-012143

(51) Int. Cl.
*H04N 13/04* (2006.01)
*G02B 27/22* (2006.01)
(Continued)

(52) U.S. Cl.
CPC .......... *G02B 27/2264* (2013.01); *H04N 13/045* (2013.01); *H04N 13/0434* (2013.01); *H04N 13/0438* (2013.01); *H04N 13/0452* (2013.01); *H04N 13/0454* (2013.01);
(Continued)

(58) Field of Classification Search
None
See application file for complete search history.

(56) References Cited

U.S. PATENT DOCUMENTS 6,188,442 B1 * 2/2001 Narayanaswami ...... H04N 5/44
345/7
6,456,432 B1 * 9/2002 Lazzaro et al. ............... 359/464
(Continued)

FOREIGN PATENT DOCUMENTS

CN 1153362 A 7/1997
JP 9-18894 A 1/1997
(Continued)

OTHER PUBLICATIONS

English translation of JP 2001112024 A.*
(Continued)

*Primary Examiner* — Tracy Li
*Assistant Examiner* — Mohammad J Rahman

(57) ABSTRACT

Disclosed is three-dimensional video viewing system (1) including: display system (2) that displays three or more videos of different parallaxes in a time-division multiplexing manner, and outputs a control signal that indicates a switching timing of the videos; input means (7) for designating an arbitrary display mode among a plurality of display modes in which a plurality of three-dimensional videos different from one another in three-dimensionality are defined by a combination of two of the three or more videos; two shutters that switch a state between light transmission and light blocking; and a shutter drive circuit that specifies the switching timing of the two videos corresponding to the display mode designated by input means (7) based on the control signal, and independently controls opening/closing of the shutters at the specified switching timing of the videos.

31 Claims, 7 Drawing Sheets

(51) Int. Cl.
*H04N 13/00* (2006.01)
*H04N 13/02* (2006.01)

(52) U.S. Cl.
CPC ......... *H04N 13/0459* (2013.01); *H04N 13/007* (2013.01); *H04N 13/0033* (2013.01); *H04N 13/0242* (2013.01); *H04N 2013/0465* (2013.01)

(56) References Cited

U.S. PATENT DOCUMENTS

| | | | |
|---|---|---|---|
| 2001/0045979 A1* | 11/2001 | Matsumoto et al. | 348/43 |
| 2004/0090601 A1* | 5/2004 | Nakanishi et al. | 353/31 |
| 2010/0007582 A1* | 1/2010 | Zalewski | 345/8 |
| 2010/0111417 A1* | 5/2010 | Ward et al. | 382/173 |
| 2010/0208042 A1* | 8/2010 | Ikeda et al. | 348/53 |

FOREIGN PATENT DOCUMENTS

| | | |
|---|---|---|
| JP | 9-84057 A | 3/1997 |
| JP | 9-107564 A | 4/1997 |
| JP | 11-355808 A | 12/1999 |
| JP | 2000134642 A | 5/2000 |
| JP | 2001112024 A | 4/2001 |
| JP | 2001296501 A | 10/2001 |
| JP | 2005235211 A | 9/2005 |
| JP | 2006129225 A | 5/2006 |

OTHER PUBLICATIONS

Son et al., "Three-Dimensional Imaging Methods Based on Multiview Images", IEEE/OSA Journal of Display Technology, vol. 1, No. 1, Sep. 2005, pp. 125-140.*

Kauff et al., Depth map creation and image-based rendering for advanced 3DTV services providing interoperability and scalability, Image Communication, vol. 22, 2007, pp. 219-234.*

International Search Report for PCT/JP2010/050526 mailed May 11, 2010.

S. Yano et al., "Two Factors in Visual Fatigue Caused from Stereoscopic Images", Journal of Institute of Image Information and Television Engineers, vol. 57, No. 9, 2003, pp. 1187-1193.

Chinese Office Action for CN Application No. 201080005359.8 issued on May 27, 2013 with English Translation.

Chinese Office Action for CN Application No. 201080005359.8 issued on Jun. 30, 2014 with English Translation.

* cited by examiner

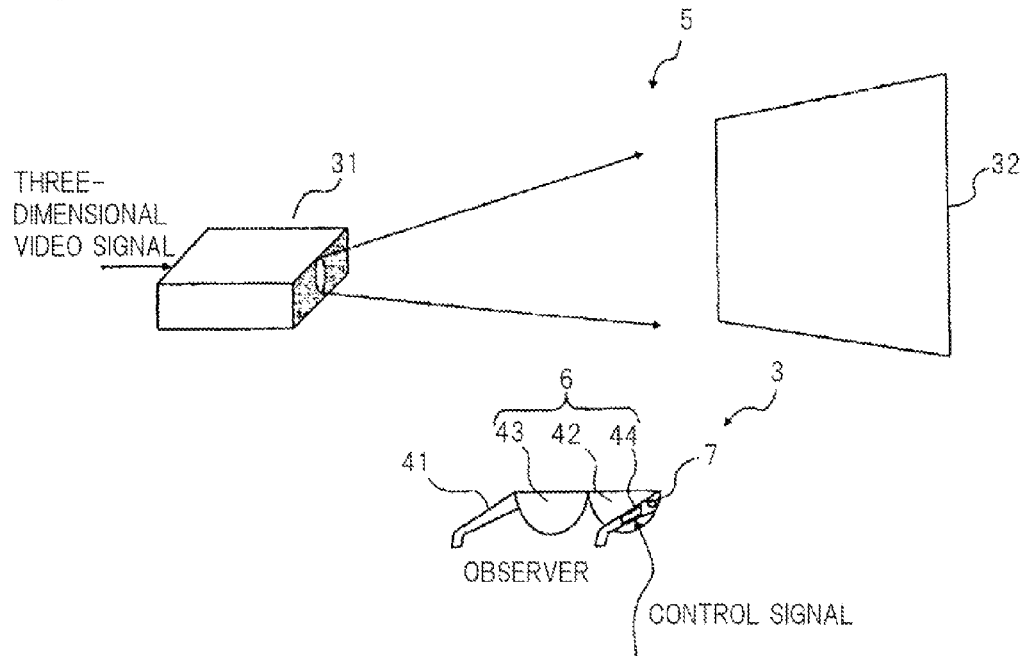

THREE-DIMENSIONAL VIDEO VIEWING SYSTEM, DISPLAY SYSTEM, OPTICAL SHUTTER, AND THREE-DIMENSIONAL VIDEO VIEWING METHOD

TECHNICAL FIELD

The present invention relates to a three-dimensional video viewing system that displays a plurality of videos on at least one display in a time-division manner, and enables a plurality of observers to select and observe desired videos.

BACKGROUND ART

There is a three-dimensional video system that provides a three-dimensional video by showing a video for a right eye and a video for a left eye having a parallax to each observer's left and right eyes. Particularly, a three-dimensional film in which a picture is projected on a large screen can provide entertainment to audiences using films that are very popular.

However, in three-dimensional display based on binocular fusion three-dimensional viewing, it is known that the observer suffers from visual fatigue (Nonpatent Literature 1). In the case of the three-dimensional film, a dual video in which the video for a right eye and the video for a left eye are superimposed is displayed on the screen, and hence the dual video is observed when three-dimensional eyeglasses are removed. The observed dual video increases the observer's fatigue. Thus, when the observer suffers from the visual fatigue caused by binocular fusion three-dimensional viewing, it is difficult to recover from the fatigue by removing the three-dimensional eyeglasses.

However, such visual fatigue does not always occur. Depending on the contents of the three-dimensional video, the degree of visual fatigue varies. Visual fatigue is difficult to occur to those who are good at or accustomed to three-dimensional viewing. However, great visual fatigue occurs to those who are not good at or unaccustomed to three-dimensional viewing. The degree of visual fatigue thus varies depending on an observer's three-dimensional viewing aptitude, creating individual differences.

Patent Literature 1 discloses a three-dimensional video display device that detects reduction of an observer's visual function, and adjusts three-dimensionality of a three-dimensional video based on the degree of fatigue estimated from the detected reduction amount of the visual function. FIG. 1 is a block diagram showing a configuration of the three-dimensional video display device discussed in Patent Literature 1.

Referring to FIG. 1, the three-dimensional video display device includes stereoscopic television (TV) 102, and liquid crystal shutter eyeglasses 101 for viewing a three-dimensional video shown on stereoscopic TV 102. Liquid crystal shutter eyeglasses 101 include electrode 103 for detecting an electro-oculogram (EOG) waveform, and amplifier 104 for amplifying a signal.

Stereoscopic TV 102 includes convergence detection unit 105, counter 106, fatigue calculation unit 107, three-dimensionality adjustment unit 108, and video display unit 109. In stereoscopic TV 102, based on a potential difference signal for a right eye and a left eye transmitted from liquid crystal shutter eyeglasses 101, reduction of a convergence function caused by fatigue of both eyes is detected by convergence detection unit 105 and counter 106. Fatigue calculation unit 107 estimates the degree of eye fatigue based on the detected reduction amount of the convergence function. Three-dimensionality adjustment unit 108 adjusts three-dimensionality based on the estimated degree of fatigue, and video display unit 109 displays a three-dimensional video based on the three-dimensionality adjusted video.

According to the three-dimensional video display device, three-dimensionality can appropriately be set according to the degree of the observer's visual fatigue.

Patent Literature 2 discloses a three-dimensional image display control device that interrupts displaying a three-dimensional video based upon the posture of an observer that indicates that fatigue will occur easily, for example, when the observer tilts his face to view the three-dimensional video. FIGS. 2A and 2B are block diagrams illustrating a configuration of the three-dimensional image display control device discussed in Patent Literature 2.

As shown in FIGS. 2A and 2B, the three-dimensional image display control device includes image switching device 181, image display device 182, shutter eyeglasses 72, left shutter driving device 183L, right shutter driving device 183R, and drive selection device 73.

Image switching device 181 alternately switches image 1L for a left eye and image 1R for a right eye in time division. Image display device 182 displays images switched by image switching device 181. Shutter eyeglasses 72 include shutters 184L and 184R for transmitting or blocking light in association with image switching device 181, and tilt sensor 71 for detecting tilting of the eyeglasses.

Left shutter driving device 183L generates a signal to drive shutter 184L. Right shutter driving device 183R generates a signal to drive shutter 184R. Drive selection device 73 determines, based on a detection result of tilt sensor 71, to which of left shutter driving device 183L and right shutter driving device 183R right shutter 184R is connected.

In the three-dimensional image display control device, when the arrangement direction of left and right eyes of observer 70 matches a horizontal direction, and when image display device 182 displays right eye image 1R, left shutter 184L blocks light while right shutter 184R transmits light. When image display device 182 displays left eye image 1L, left shutter 184L transmits light while right shutter 184R blocks light. Under this control, only left eye and right eye images respectively enter the observer's left and right eyes, enabling three-dimensional observation of the left and right images having a parallax.

When an angle between the arrangement direction of the left and right eyes of observer 70 and the horizontal direction exceeds a predetermined angle, for example, 20 degrees, tilt sensor 71 detects tilting of the eyeglasses. Based on the detected tilting of the eyeglasses, drive selection device 73 connects right shutter 184R to left shutter driving device 183L. Left and right shutters 184L and 184R both transmit light only when image display device 182 displays left eye image 1L, and hence only left eye image 1L enters observer's left and right eyes 70L and 70R. This state is similar to that of viewing not a three-dimensional image but a normal two-dimensional image, and thus no fatigue is generated by binocular fusion three-dimensional viewing.

According to the three-dimensional image display control device, when tilting of the observer's face is detected, by interrupting the displaying the three-dimensional image, the video can be viewed in the state similar to that when the normal video is viewed.

Patent Literature 3 discloses a three-dimensional video playback device that can switch a plane mode and a three-dimensional mode. In the three-dimensional video playback device, a right video and a left video are alternately displayed when the three-dimensional mode is set, and the right video or the left video is displayed when the plane mode is selected.

CITATION LIST

Patent Literature

Patent Literature 1: JP9-18894A (shown in FIG. 3)
Patent Literature 2: JP2001-296501A (shown in FIG. 8)
Patent Literature 3: JP2000-13462 (shown in FIG. 3)

Nonpatent Literature

Nonpatent Literature: pp. 1187 to 1193, Journal of Institute of Image Information and Television Engineers Vol. 57, No. 9.

DISCLOSURE OF THE INVENTION

As described above, the degree of visual fatigue varies depending on observer's three-dimensional viewing aptitudes, creating individual differences. When distances from the audience to a screen are greatly different depending on seats, for example, in a movie theater, the difference between conditions when the three-dimensional video has been taken and observation conditions of the audience may be increased at a certain seat. In such a case, the audience may experience uncomfortable with three-dimensionality. The degree of audience's visual fatigue also varies depending on physical conditions. Thus, the three-dimensional viewing aptitude is not uniquely determined for each individual but fluctuates depending on the observation environment.

When a parent and a child enjoy three-dimensional films, care must be taken not to show a video of extremely high three-dimensionality to a child whose visual function is in the developmental stage.

For the reason described above, when many observers view the same three-dimensional video, three-dimensionality must be adjusted according to each observer's three-dimensional viewing aptitude or degree of fatigue.

However, the three-dimensional video viewing device discussed in Patent Literature 1 is configured to adjust the three-dimensionality in stereoscopic TV 102 side, and hence the three-dimensionality of the three-dimensional video cannot be adjusted according to each observer's three-dimensional viewing aptitude or degree of fatigue.

In the three-dimensional image display control device discussed in Patent Literature 2, the three-dimensionality of the displayed three-dimensional video is fixed, and hence the occurrence of visual fatigue cannot be suppressed by switching displaying of the three-dimensional video to displaying of a video having reduced three-dimensionality or a two-dimensional image. Additionally, the three-dimensionality of the three-dimensional video cannot be adjusted according to each observer's three-dimensional viewing aptitude or degree of fatigue.

In the three-dimensional video playback device discussed in Patent Literature 3, only the display mode is switched. Thus, the three-dimensionality of the three-dimensional video cannot be adjusted according to each observer's three-dimensional viewing aptitude or degree of fatigue.

As described above, in the devices discussed in Patent Literatures 1 to 3, it is difficult to simultaneously provide the same three-dimensional video to a large audience to simultaneously enjoy the video and to provide a three-dimensional video suited to three-dimensional viewing aptitudes that vary from individual to individual, thereby reducing visual fatigue.

It is therefore an object of the present invention to provide a three-dimensional video viewing system that can set, when a large audience simultaneously views the same three-dimensional video, observation conditions of the three-dimensional video for each observer, and suppress visual fatigue, a display system, an optical shutter, and a three-dimensional video viewing method.

Solution to Problem

In order to achieve the object, a three-dimensional video viewing system according to the present invention includes:

a display system that multiplexes and displays, in a time-division manner, three or more videos that are different in parallax and that constitute a three-dimensional video, and outputs a control signal indicating a switching timing of each video;

input means for designating an arbitrary display mode among a plurality of display modes in which a plurality of three-dimensional videos different in three-dimensionality are defined by a combination of two of the three or more videos;

two shutters that switch a state in which light is transmitted and a state in which light is blocked; and a shutter driving circuit that specifies switching timings of the two videos corresponding to the display mode designated by the input means based on the control signal, and that independently controls opening/closing of the two shutters based on the specified switching timings of the videos.

Another three-dimensional video viewing system according to the present invention includes:

a display system that multiplexes and displays, in a time-division manner, three or more videos that are different in parallax and that constitute a first three-dimensional video using first polarized light, that multiplexes, in a time-division manner, three or more videos that are different in parallax and that constitute a second three-dimensional video partially different in content from the first three-dimensional video to display the videos using second polarized light different in polarization component from the first polarized light, and that outputs a control signal indicating switching timings of the videos displayed by the first polarized light and the second polarized light;

input means for designating, for the first and second three-dimensional videos, an arbitrary display mode from among a plurality of display modes in which a plurality of three-dimensional videos different in three-dimensionality are defined by a combination of two of the three or more videos;

two shutters that can select a polarization component of light to be transmitted, and that switch a state in which light is transmitted and a state in which light is blocked; and a shutter driving circuit that specifies switching timings of the two videos corresponding to the display mode designated by the input means based on the control signal, that independently controls opening/closing of the two shutters based on the specified switching timings of the videos, and that selects the polarization components of the polarized light used for displaying the two videos corresponding to the designated display mode by the two shutters.

A display system according to the present invention includes:

control means for outputting a three-dimensional video signal generated by multiplexing three or more videos that are different in parallax and that constitute a three-dimensional video in a time-division manner, and a control signal indicating frame switching of the three-dimensional video signal; and display means for displaying a video based on the three-dimensional video signal from the control means. In this case, based on the control signal, a plurality of three-dimensional videos different in three-dimensionality are supplied to an external device by a combination of two of the three or more videos.

Another display system according to the present invention includes:

control means for outputting a first three-dimensional video signal generated by multiplexing three or more videos that are different in parallax and that constitute a first three-dimensional video in a time-division manner and a second three-dimensional video signal generated by multiplexing the three or more videos that are different in parallax and that constitute a second three-dimensional video partially different in content from the first three-dimensional video, and for outputting a control signal indicating frame switching timings of the three-dimensional video signals; and display means for displaying a video based on the first three-dimensional video signal using first polarized light, and a video based on the second three-dimensional video signal using second polarized light different in polarization component from the first polarized light. In this case, based on the control signal, for the first and second three-dimensional videos, a plurality of three-dimensional videos different in three-dimensionality are supplied to an external device by a combination of two of the three or more videos constituting the three-dimensional video.

An optical shutter according to the present, which is communicable with a display system that multiplexes and displays, in a time-division manner, three or more videos that are different in parallax and that constitute a three-dimensional video, and outputs a control signal indicating a switching timing of each video, includes:

input means for designating an arbitrary display mode among a plurality of display modes in which a plurality of three-dimensional videos different in three-dimensionality are defined by a combination of two of the three or more videos;

two shutters that switch a state in which light is transmitted and a state in which light is blocked; and a shutter driving circuit that specifies switching timings of the two videos corresponding to the display mode designated by the input means based on the control signal, and that independently controls opening/closing of the two shutters based on the specified switching timings of the videos.

Another optical shutter according to the present invention, which is communicable with a display system that multiplexes and displays, in a time-division manner, three or more videos that are different in parallax and that constitute a first three-dimensional video using first polarized light, multiplexes, in a time-division manner, three or more videos that are different in parallax and that constitute a second three-dimensional video partially different in content from the first three-dimensional video to display the videos using second polarized light different in polarization component from the first polarized light, and outputs a control signal indicating switching timings of the videos displayed by the first polarized light and the second polarized light, includes:

input means for designating, for the first and second three-dimensional videos, an arbitrary display mode among a plurality of display modes in which a plurality of three-dimensional videos different in three-dimensionality are defined by a combination of two of the three or more videos;

two shutters that can select a polarization component of light to be transmitted, and switch a state in which light is transmitted and a state in which light is blocked; and a shutter driving circuit that specifies switching timings of the two videos corresponding to the display mode designated by the input means based on the control signal, that independently controls opening/closing of the two shutters based on the specified switching timings of the videos, and that selects the polarization components of the polarized light used for displaying the two videos corresponding to the designated display mode by the two shutters.

A three-dimensional video viewing method, according to the present invention, of multiplexing and displaying, in a time-division manner, three or more videos that are different in parallax and that constitute a three-dimensional video by a display system, and of observing the displayed videos via two shutters for switching a state in which light is transmitted and a state in which light is blocked, includes:

receiving a control signal indicating switching timings of the three or more videos from the display system; and specifying, when a display mode is designated among a plurality of display modes in which a plurality of three-dimensional videos different in three-dimensionality are defined by a combination of two of the three or more videos, switching timings of the two videos corresponding to the designated display mode based on the control signal, and independently controlling opening/closing of the two shutters based on the specified switching timings of the videos.

Another three-dimensional video viewing method, according to the present invention, of multiplexing and displaying, in a time-division manner, three or more videos that are different in parallax and that constitute a first three-dimensional video using first polarized light in a display system, of multiplexing, in a time-division manner, three or more videos that are different in parallax and that constitute a second three-dimensional video partially different in content from the first three-dimensional video to display the videos using second polarized light different in polarization component from the first polarized light, and of observing the displayed videos via two shutters for switching a state in which light is transmitted and a state in which light is blocked, includes:

receiving a control signal indicating switching timings of the videos displayed by the first polarized light and the second polarized light; and specifying, for the first and second three-dimensional videos, when a display mode is designated among a plurality of display modes in which a plurality of three-dimensional videos different in three-dimensionality are defined by a combination of two of the three or more videos, switching timings of the two videos corresponding to the designated display mode based on the control signal, independently controlling opening/closing of the two shutters based on the specified switching timings of the videos, and selecting the polarization components of the polarized light used for displaying the two videos corresponding to the designated display mode by the two shutters.

BRIEF DESCRIPTION OF DRAWINGS

FIG. 5 A view showing a specific configuration of display means and an optical shutter in the three-dimensional video viewing system according to the first exemplary embodiment of the present invention.

FIG. 6 A timing chart showing an operation of the optical shutter in the three-dimensional video viewing system according to the first exemplary embodiment of the present invention.

EXPLANATION OF REFERENCE NUMERALS

Figure 1:
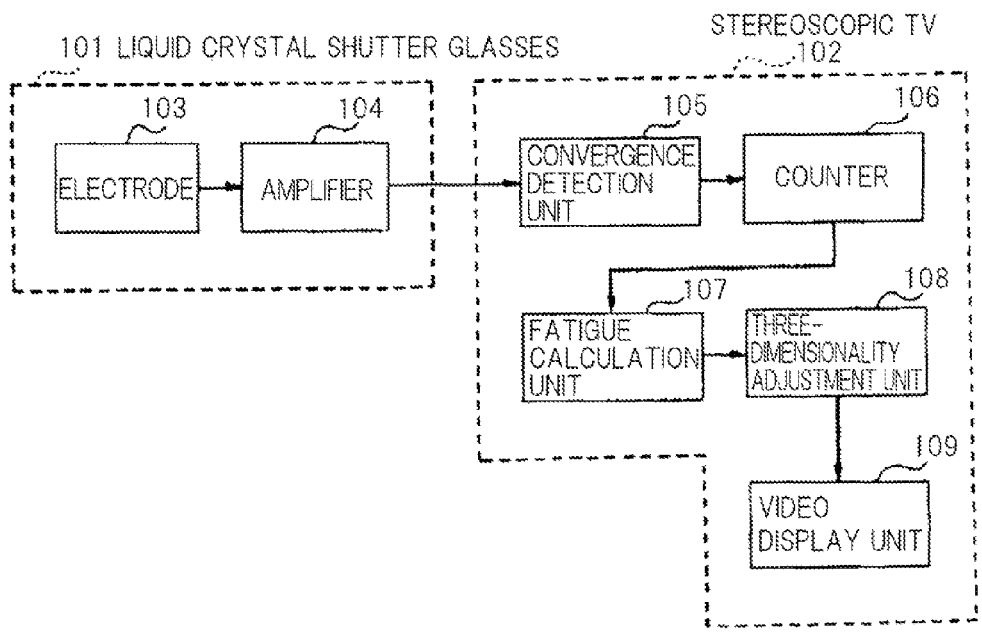
FIG. 1 A block diagram showing a configuration of a three-dimensional video display device discussed in JP9-18894A.
Figure 2A:
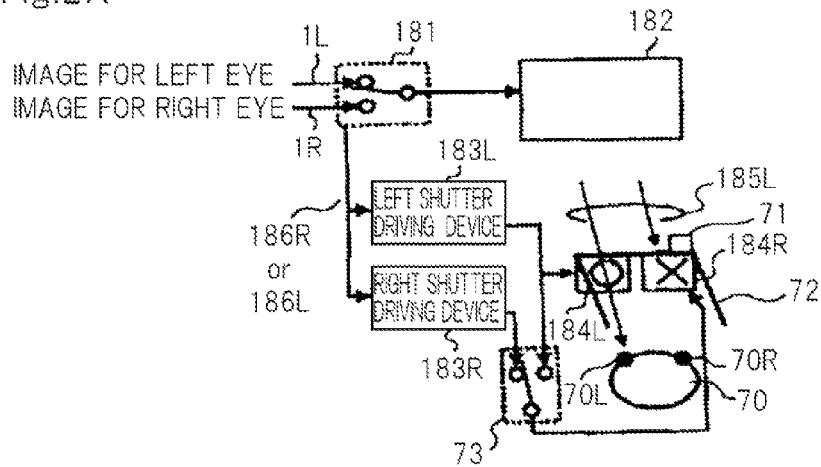
FIG. 2A A block diagram showing a state of a three-dimensional image display control device discussed in JP2001-296501A.
Figure 2B:
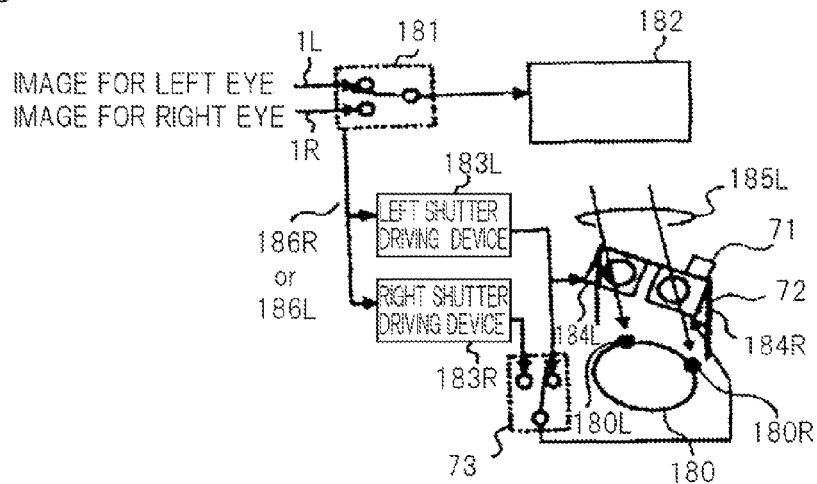
FIG. 2B A block diagram showing another state of the three-dimensional image display control device discussed in JP2001-296501A.

1 three-dimensional video viewing system
2 display system
3 optical system
4 control means
5 display means
6 shutter means
7 input means
8 optical shutter
9 polarization plate
21, 22, 23, 28, 29, 30 video playback device
24 control circuit
25 memory
26 synthetic circuit
27 three-dimensional video generator
31, 33, 34, 35, 51, 52 projector
32 screen
36 first optical shutter
37 second optical shutter
38 third optical shutter
41 three-dimensional eyeglasses
42, 45 optical shutter for right eye
43, 46 optical shutter for left eye
44, 47 optical shutter driving device
53 vertical polarization plate
54 horizontal polarization plate
61, 64 liquid crystal cell
62, 63 polarization plate

DESCRIPTION OF EMBODIMENTS

Hereinafter, exemplary embodiments of the present invention are described with reference to the drawings.

(First Exemplary Embodiment)

Figure 3:
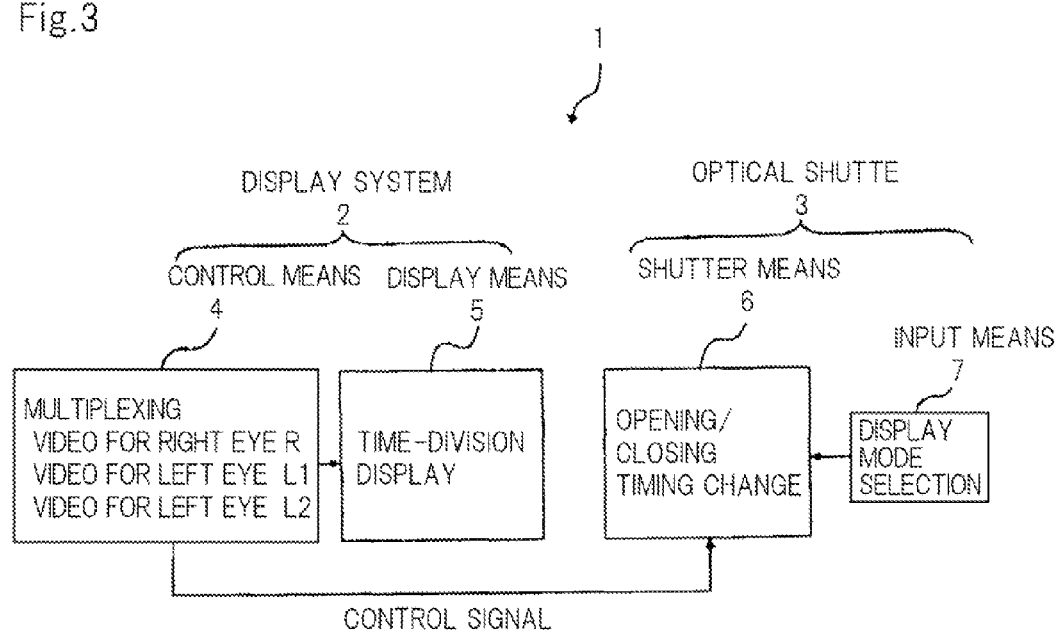
FIG. 3 A block diagram showing a configuration of a three-dimensional video viewing system according to a first exemplary embodiment of the present invention.

FIG. 3 is a block diagram showing a configuration of a three-dimensional video viewing system according to a first exemplary embodiment of the present invention. In the embodiment, each observer views a video by appropriately selecting one of three display modes, namely, a normal three-dimensional display, a three-dimensional display having three-dimensionality reduced, and a two-dimensional image display. Thus, the observer can view an easily viewable three-dimensional video in which visual fatigue is difficult to occur.

As shown in FIG. 3, three-dimensional video viewing system 1 includes display system 2 and optical shutter 3. Display system 2 includes control means 4 and display means 5. Optical shutter 3 includes shutter means 6 and input means 7.

Control means 4 multiplexes, in a time-division manner, each video signal of right eye video R and left eye video L1 which constitute a three-dimensional video and a left eye video L2 having three-dimensionality reduced to generate a three-dimensional video signal, and transmits the three-dimensional video signal to display means 5. Simultaneously, control means 4 transmits a control signal indicating frame switching of a video to shutter means 6.

Display means 5 time-sequentially switches and displays right eye video R, left eye video L1, and left eye video L2 having the three-dimensionality reduced from the input three-dimensional video signal. Shutter means 6 is, for example, a liquid crystal optical shutter, and includes a liquid crystal optical shutter for a right eye and a liquid crystal optical shutter for a left eye, which constitute three-dimensional eyeglasses. The right eye and left eye liquid crystal optical shutters can independently be controlled to be opened/closed.

Input means 7 can select a display mode, and supplies a signal indicating a display mode selected by the observer to shutter means 6. Shutter means 6 determines, according to the display mode that the observer has selected by input means 7, opening/closing timings of the right eye and left eye liquid crystal optical shutters with the control signal from control means 4 set as a reference, and controls opening/closing of the liquid crystal optical shutters.

Figure 4:
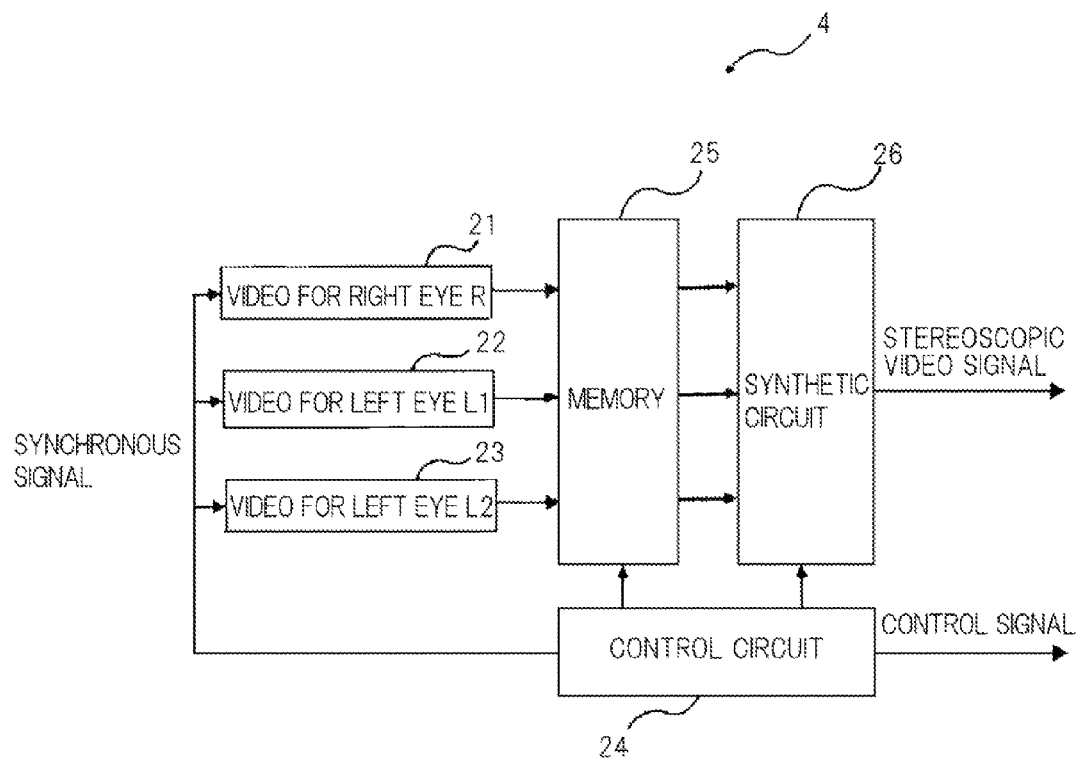
FIG. 4 A block diagram showing control means in the three-dimensional video viewing system according to the first exemplary embodiment of the present invention.

FIG. 4 is a block diagram showing a specific configuration of control means 4. Referring to FIG. 4, control means 4 includes three video playback devices 21, 22, and 23, control circuit 24, memory 25, and synthetic circuit 26.

Video playback device 21 plays a medium on which right eye video R has been recorded. Video playback device 22 plays a medium on which left eye video L1 has been recorded. Video playback device 23 plays a medium on which left eye video L2 having the three-dimensionality reduced has been recorded. A synchronous signal is supplied to each of video playback devices 21, 22, and 23 from control circuit 24. Video playback devices 21, 22, and 23 reproduce frames of the media in synchronization based on the synchronous signal from control circuit 24. Video signals reproduced at video playback devices 21, 22, and 23 in synchronization are output to memory 25.

A creation procedure of the media on which right eye video R, left eye video L1, and left eye video L2 have been recorded is briefly described. To acquire right eye video R, left eye video L1, and left eye video L2, first and second cameras located at the interval of both human eyes and a third camera located at an intermediate position between these cameras are used. Right eye video R and left eye video L1 are shot by the first and second cameras, and simultaneously left eye video L2 having the three-dimensionality reduced is shot by the third camera. The videos from the first to third cameras are directly recorded, or edited and processed to be recorded on a medium such as a magnetic tape. The media on which right eye video R, left eye video L1, and left eye video L2 have been recorded are accordingly acquired. As recording media, a DVD (digital versatile disc) and a hard disk can be used in addition to the magnetic tape.

Video playback devices 21, 22, and 23 can be located in different places. In such a case, right eye video R, left eye video L1, and left eye video L2 are respectively supplied from video playback devices 21, 22, and 23 to memory 25 via a network.

Without using three video playback devices 21, 22, and 23, the synchronously controlled video output signals from the first to third cameras can be directly output to the memory.

Image data of right eye video R, left eye video L1, and left eye video L2 having the three-dimensionality reduced are stored by frames in memory 25. Control circuit 24 controls reading of the image data from memory 25. In memory 25, the stored image data are sequentially read at a frequency that is three times larger than that of the synchronous signal. Each image data read from memory 25 is supplied to synthetic circuit 26.

An operation of synthetic circuit 26 is controlled by control circuit 24. Synthetic circuit 26 multiplexes, in a time-division manner, the image data sequentially read from memory 25 at a frequency that is three times larger than that of the synchronous signal. In other words, synthetic circuit 26 time-sequentially synthesizes signals of right eye video R, left eye video L1, and left eye video L2 having the three-dimensionality reduced at a frequency that is three times larger to generate a three-dimensional video signal. During the generation of the three-dimensional video signal by synthetic circuit 26, control circuit 24 generates a control signal synchronized with the generated three-dimensional video signal.

Display system 2 can be configured such that the three-dimensional video signal generated by synthetic circuit 26 is recorded on a recording medium and the recording medium is played when necessary. In such a case, a control signal is generated from a synchronous signal synchronized with a three-dimensional video signal acquired by playing the recording medium.

FIG. 5 shows a specific configuration of display means 5 and optical shutter 3.

Display means 5 shown in FIG. 5 includes projector 31 and screen 32. Projector 31 receives the three-dimensional video signal input from control means 4, and time-sequentially projects right eye video R, left eye video L1, and left eye video L2 having the three-dimensionality reduced to screen 32.

The observer views the three-dimensional video through optical shutter 3 shown in FIG. 5. Optical shutter 3 includes shutter means 6 that includes right eye optical shutter 42, left eye optical shutter 43, and optical shutter driving circuit 44, and input means 7 for selecting a display mode. In the embodiment, optical shutter 3 is formed into the shape of eyeglasses, namely, three-dimensional eyeglasses 41.

Right eye optical shutter 42 and left eye optical shutter 43 are liquid crystal optical shutters, includes a liquid crystal cell in which a cell is formed by using two glass substrates on which transparent electrodes are formed and a liquid crystal is filled in a space between the glass substrates, a polarization plate being provided to the light entrance/exit surface of the liquid crystal cell. Right eye optical shutter 42 and left eye optical shutter 43 transmit light when no voltage is applied to the transparent electrodes, and block light when voltages are applied to the transparent electrodes.

Optical shutter driving circuit 44 determines, according to the display mode that the observer has selected by input means 7, opening/closing timings based on the control signal transmitted from control means 4, and independently controls opening/closing of right eye optical shutter 42 and left eye optical shutter 43.

In FIG. 5, the control signal can be supplied to optical shutter driving circuit 44 by wire communication, infrared communication or wireless communication.

Input means 7 and optical shutter driving circuit 44 can be installed as separate units in place of being included in three-dimensional eyeglasses 41. For example, in a movie theater, input means 7 or optical shutter driving circuit 44 can be mounted to the backrest of a front seat, and a signal to drive the liquid crystal optical shutter can be supplied from optical shutter driving circuit 44 to three-dimensional eyeglasses 41.

FIG. 6 is a timing chart showing the relationship among a display video displayed by display means 5, a control signal, and a state of the optical shutter of three-dimensional eyeglasses 41 in each display mode.

The display video includes right eye video R, left eye video L1, and left eye video L2 having the three-dimensionality reduced displayed at a repetition frequency of 60 hertz. In other words, a video of each frame is switched at a frequency of 180 hertz to be displayed.

The control signal is set to a high level only when, for example, right eye video R is displayed. By using this signal as a reference, display timings of left eye video L1 and left eye video L2 having the three-dimensionality reduced can be specified. The control signal is not limited to the signal shown in FIG. 6. Any signal can be used as long as it can specify a switching timing of the frame of each video.

An observer who is good at or accustomed to three-dimensional viewing selects a normal three-dimensional display as a display mode. When the normal three-dimensional display is selected, the optical shutter is controlled to open, by using the control signal as a reference, right eye optical shutter 42 during a display period of right eye video R, and open left eye optical shutter 43 during a display period of left eye video L1. The observer watches right eye video R and left eye video L1 respectively with right and left eyes, and can accordingly view a normal three-dimensional video.

On the other hand, an observer who is not good at or unaccustomed to three-dimensional viewing selects a three-dimensional display having three-dimensionality reduced. When the three-dimensional display having the three-dimensionality reduced is selected, the optical shutter is controlled to open, by using the control signal as a reference, right eye optical shutter 42 during a display period of right eye video R, and open left eye optical shutter 43 during a display period of left eye video L2 having the three-dimensionality reduced. The observer watches right eye video R and left eye video L2 respectively with right and left eyes, and can accordingly view a video having three-dimensionality reduced.

An observer who finds three-dimensional viewing to be difficult or feels visual fatigue selects a two-dimensional image display. When the two-dimensional image display is selected, the optical shutter is controlled to simultaneously open, by using the control signal as a reference, right eye and left eye optical shutters during a display period of right eye video R. The observer watches same right eye video R having no parallax with left and right eyes, and can accordingly view a video as in the case of viewing a normal two-dimensional image. In this case, the observer feels no fatigue caused by binocular fusion three-dimensional viewing.

Though not shown in FIG. 6, a display mode in which the right eye or the left eye optical shutter is always closed, and the other optical shutter is opened when, for example, right eye video R is displayed. When the video is viewed with one eye, it becomes difficult to sense that the screen is planar, and a sense of depth can be acquired based on a depth cue other than both-eye parallax, such as motion of the video, a perspective or a shadow. Thus, even the observer who finds three-dimensional viewing to be difficult due to both-eye parallax can view a three-dimensional video. This method is effective particularly for a large-screen video such as a film.

According to the embodiment, as in the case of a three-dimensional film, even when a large audience simultaneously views the same three-dimensional video, observers having individual differences in three-dimensional viewing aptitude, observers different in age, and observers different in seat position can respectively set individual three-dimensionalities of the three-dimensional video on the spot. Thus, a three-dimensional video viewing system can be acquired, in which visual fatigue is difficult to occur and which gives consideration to a universal design enabling much more people to view an easily viewable three-dimensional image.

The embodiment has been described by way of case where right eye video R, left eye video L1, and left eye video L2 having the three-dimensionality reduced are used. However, left eye video L3 emphasizing three-dimensionality, which is shot by a camera located further outside the two cameras installed at the interval of the human eyes, can be used. In this case, a display video includes four videos displayed at a repetition frequency of 60 hertz, namely, right eye video R, left eye video L1, left eye video L2 having the three-dimensionality reduced, and left eye video L3 emphasizing the three-dimensionality, and a video of each frame is switched at a frequency of 240 hertz to be displayed. The display mode includes four display modes, namely, a normal three-dimensional display, a three-dimensional display having three-dimensionality reduced, a three-dimensional display emphasizing three-dimensionality, and a two-dimensional image display. In this case, operation control of three-dimensional eyeglasses 41 is only required to control opening/closing according to the display mode. The same applies when five or more videos are used.

The embodiment has been described by using the three-dimensional video shot by the camera. However, a similar three-dimensional viewing system can be acquired even when a three-dimensional video created by using a computer graphics technology is used.

As display means 5, the example of the projection type display device that uses projector 31 and screen 32 has been described. However, a direct-view-type display device such as a liquid crystal television or a plasma television can be used.

The control signal transmitted from control means 4 to optical shutter 4 can be transmitted to shutter means 6 via display means 5.

(Second Exemplary Embodiment)

Figure 7:
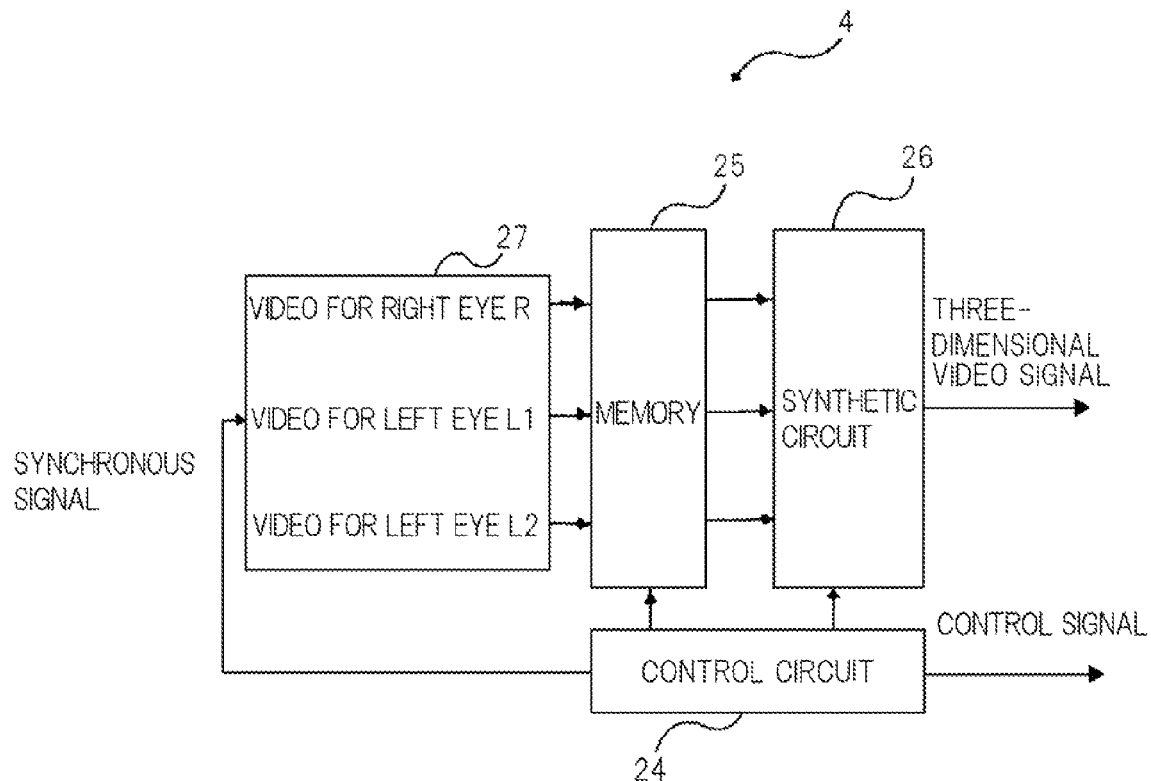
FIG. 7 A block diagram showing control means in a three-dimensional video viewing system according to a second exemplary embodiment of the present invention.

FIG. 7 is a block diagram showing a configuration of control means 4 in a three-dimensional video viewing system according to a second exemplary embodiment of the present invention.

According to the embodiment, generating a plurality of three-dimensional videos different in three-dimensionality from a smaller number of videos enables many people to view an easily viewable three-dimensional video by utilizing various contents. The three-dimensional video viewing system of the embodiment is different from that of the first embodiment in that three-dimensional video generator 27 is used in place of three video playback devices 21, 22, and 23.

Three-dimensional video generator 27 generates a plurality of three-dimensional videos from a smaller number of videos in place of using the videos shot by the three cameras. For example, three-dimensional video generator 27 generates right eye video R, left eye video L1, and left eye video L2 having three-dimensionality reduced in real time by using an existing technology such as a technology of generating a plurality of three-dimensional videos different in three-dimensionality from a two-dimensional video having motion, a technology of generating a plurality of three-dimensional videos different in three-dimensionality from two-dimensional image data and a depth map, or a technology of generating a plurality of three-dimensional videos different in three-dimensionality by interpolating or extrapolating an intermediate image from a set of three-dimensional images. These videos can be used as video sources for control means 4.

According to this configuration, effects similar to those of the first embodiment can be acquired by utilizing contents in which there is no left eye video L2 having three-dimensionality reduced or contents of only a two-dimensional video in which there is no three-dimensional video.

(Third Exemplary Embodiment)

Figure 8:
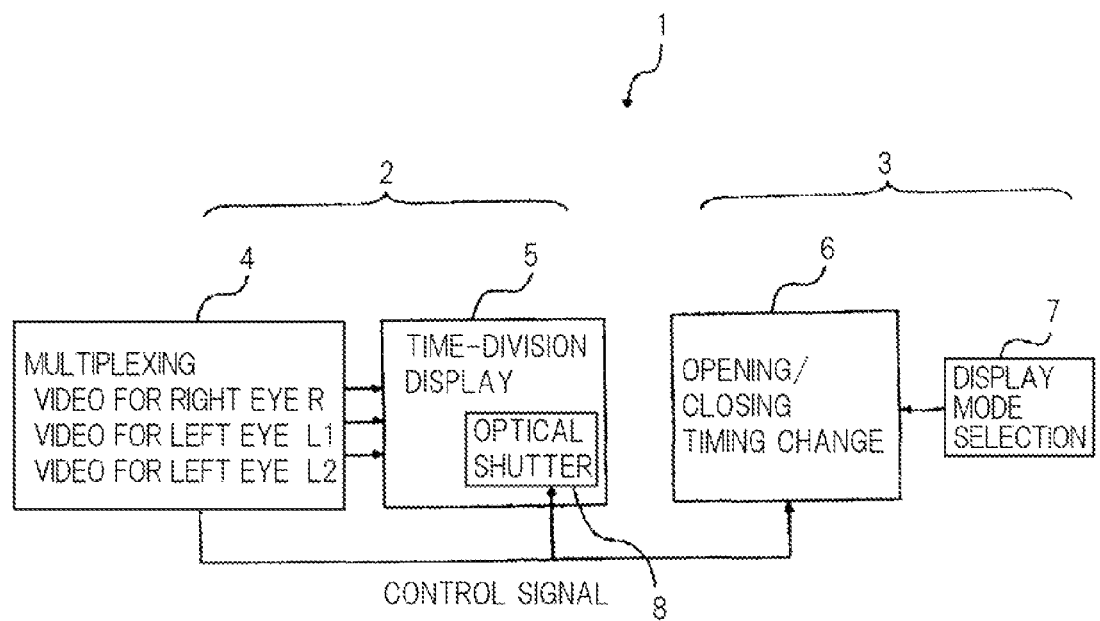
FIG. 8 A block diagram showing a configuration of a three-dimensional video viewing system according to a third exemplary embodiment of the present invention.

FIG. 8 is a block diagram showing a configuration of a three-dimensional video viewing system according to a third exemplary embodiment of the present invention.

According to the embodiment, even by using a display device in which high-speed displaying is difficult, a three-dimensional video viewing system that enables many people to view an easily viewable three-dimensional video can be constructed.

Three-dimensional video viewing system 1 shown in FIG. 8 includes display system 2 that includes control means 4 and display means 5, and optical shutter 3 that includes shutter means 6 and input means 7. Display means 5 includes optical shutter 8. Control means 4 reproduces video signals of right eye video R and left eye video L1 which constitute a three-dimensional video, and left eye video L2 having three-dimensionality reduced in synchronization, and transmits the video signals to display means 5. Simultaneously, control means 4 transmits a control signal that indicates frame switching of the videos to shutter means 6 and optical shutter 8. A configuration and an operation of optical shutter 3 are similar to those of the first embodiment. As a functional unit of control means 4 for outputting or generating videos R, L1, and L2, the three-dimensional video generators (three or more video generators) of the first embodiment or the three-dimensional video generator of the second embodiment can be applied.

Figure 9:
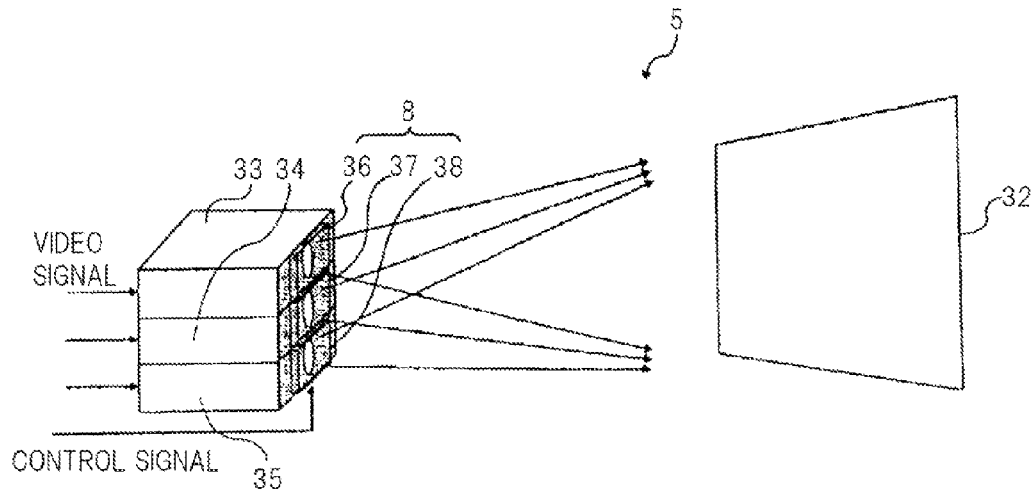
FIG. 9 A view showing a specific configuration of display means and an optical shutter in the three-dimensional video viewing system according to the third exemplary embodiment of the present invention.

FIG. 9 shows a specific configuration of display means 5.

Display means 5 shown in FIG. 9 includes three projectors 33, 34, and 35, screen 32, and optical shutter 8. Optical shutter 8 includes first optical shutter 36, second optical shutter 37, and third optical shutter 38. Optical shutters 36, 37, and 38 are located in light exit positions of three projectors 33, 34, and 35.

Three projectors 33, 34, and 35 receive the video signals input from control means 4, and time-sequentially project right eye video R, left eye video L1, and left eye video L2 having the three-dimensionality reduced to screen 32.

First optical shutter 36, second optical shutter 37, and third optical shutter 38 are controlled to be opened/closed based on the control signal from control means 4. Specifically, as shown in the timing chart of FIG. 6, opening/closing timings and periods of optical shutters 36, 37, and 38 are controlled so that videos in which right eye video R, left eye video L1, and left eye video L2 having the three-dimensionality reduced are switched at a frequency of 180 hertz can be projected to screen 32. As a result, the videos projected to screen 32 are similar to those of the first embodiment.

According to this configuration, effects similar to those of the first embodiment are acquired without switching and displaying the videos at a high speed by the projectors.

(Fourth Exemplary Embodiment)

Figure 10:
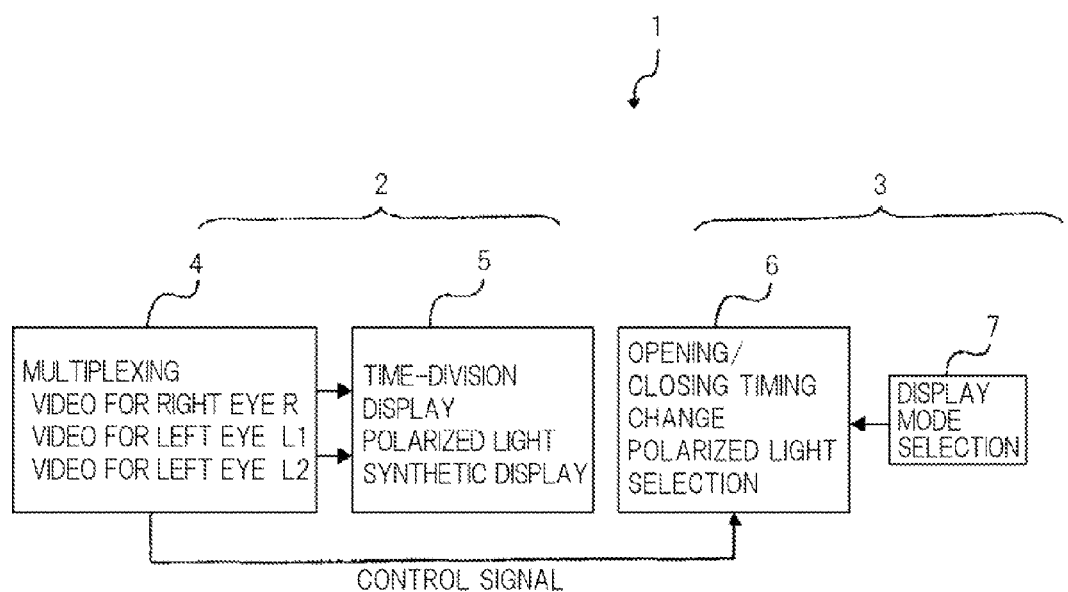
FIG. 10 A block diagram showing a configuration of a three-dimensional video viewing system according to a fourth exemplary embodiment of the present invention.

FIG. 10 is a block diagram showing a three-dimensional video viewing system according to a fourth exemplary embodiment of the present invention.

According to the embodiment, much more people can view an easily viewable video by enabling selection of observation conditions of a three-dimensional video in addition to three-dimensionality.

In the embodiment, each observer views a video by appropriately selecting one of six display modes: two types of modes, i.e., there is a caption and there is no caption, corresponding to a mode of each of a normal three-dimensional display, a three-dimensional display having three-dimensionality reduced, and a two-dimensional image display. Thus, the observer can view an easily viewable three-dimensional video in which visual fatigue is difficult to occur.

Three-dimensional video viewing system 1 shown in FIG. 10 includes display system 2 that includes control means 4 and display means 5, and optical shutter 3 that includes shutter means 6 and input means 7. Control means 4 includes three-dimensional video generation means. The three-dimensional video generation means multiplexes video signals of right eye video R1 and left eye video L1, which constitute a three-dimensional video without a caption, and of left eye video L2 having three dimensionality reduced in a time-division manner to generate a three-dimensional video signal, and multiplexes video signals of right eye video R2 and left eye video L3, which constitute a three-dimensional video with a caption, and of left eye video L4 having three dimensionality reduced in a time-division manner to generate a three-dimensional video signal. Control means 4 transmits the generated three-dimensional video signals to display means 5. Simultaneously, control means 4 transmits a control signal indicating frame switching of the videos to shutter means 6.

Display means 5 time-sequentially switches and displays right eye video R1, left eye video L1, and left eye video L2 having the three dimensionality reduced, which are videos without a caption and which are included in the input three-dimensional video signal and simultaneously, time-sequentially switches and displays right eye video R2, left eye video L3, and left eye video L4 having the three dimensionality reduced, which are videos with a caption and which are included in the input three-dimensional video signal. The videos without a caption and the videos with a caption are synthesized to be displayed by setting polarization directions of projection light in the displays orthogonal to each other.

Shutter means 6 includes a polarization switch for selecting polarized light on, for example, a front face of a liquid crystal optical shutter. Right eye and left eye optical shutters included in three-dimensional eyeglasses can be independently controlled to be opened/closed, and can select polarized light. Shutter means 6 switches polarized light to be selected according to a display mode that the observer has selected by input means 7, and determines opening/closing timings by using the control signal as a reference to control opening/closing of the right eye and left eye optical shutters.

Figure 11:
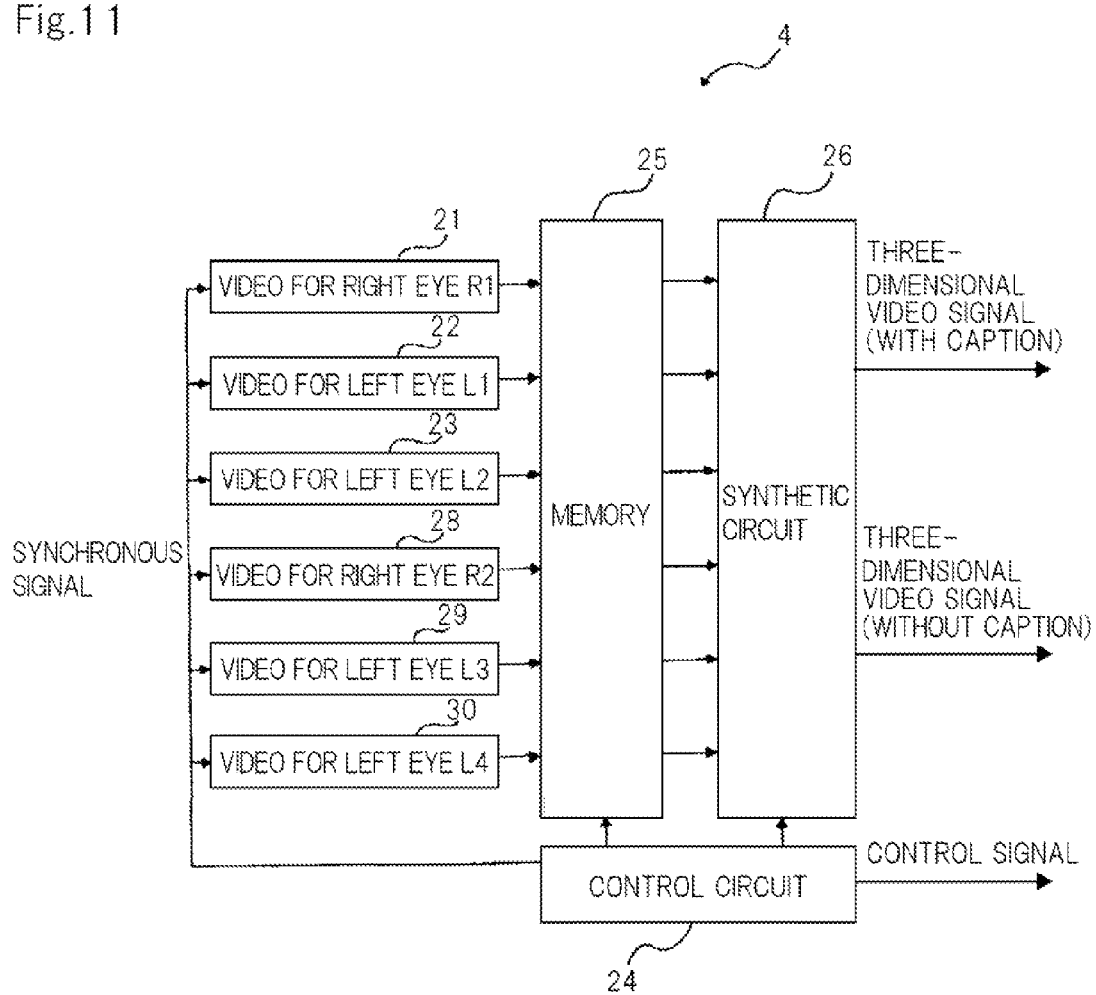
FIG. 11 A block diagram showing a configuration of control means in the three-dimensional video viewing system according to the fourth exemplary embodiment of the present invention.

FIG. 11 is a block diagram showing a specific configuration of control means 4 according to the fourth embodiment.

Control means 4 (three-dimensional video generation means) shown in FIG. 11 includes six video playback devices 21, 22, 23, 28, 29, and 30, and control circuit 24, memory 25, and synthetic circuit 26.

Video playback device 21 plays a medium on which right eye video R1 without a caption has been recorded. Video playback device 22 plays a medium on which left eye video L1 without a caption has been recorded. Video playback device 23 plays a medium on which left eye video L2 without a caption which has the three-dimensionality reduced has been recorded. Video playback device 28 plays a medium on which right eye video R2 with a caption has been recorded. Video playback device 29 plays a medium on which left eye video L3 with a caption has been recorded. Video playback device 30 plays a medium on which left eye video L4 with a caption which has the three-dimensionality reduced has been recorded. Video playback devices 21, 22, 23, 28, 29, and 30 reproduce frames in synchronization based on a synchronous signal, and output respectively reproduced video signals to memory 25.

Image data of right eye video R1, left eye video L1, and left eye video L2 having the three-dimensionality reduced, which are videos without a caption, are stored by frames in memory 25. Control circuit 24 reads the image data stored in memory 25 at a frequency that is three times larger than that of the synchronous signal. Synthetic circuit 26 multiplexes the image data read from memory 25 in a time-division manner. Similarly, image data of right eye video R2, left eye video L3, and left eye video L4 having the three-dimensionality reduced, which are videos without a caption, are stored by frames in memory 25. Control circuit 24 reads the image data stored in memory 25 at a frequency three times larger than that of the synchronous signal. Synthetic circuit 26 multiplexes the image data read from memory 25 in a time-division manner. Thus, synthetic circuit 26 generates a three-dimensional video signal without a caption in which the signals of right eye video R1, left eye video L1, and left eye video L2 having the three-dimensionality reduced are time-sequentially synthesized at the frequency three times larger than that of the synchronous signal, and a three-dimensional video signal with a caption in which the signals of right eye video R2, left eye video L3, and left eye video L4 having the three-dimensionality reduced are time-sequentially synthesized at a frequency that is three times larger than that of the synchronous signal. In this case, control circuit 24 generates a control signal synchronized with the generated three-dimensional video signals.

The present invention can employ a configuration where the generated two three-dimensional video signals are recorded on a recording medium and reproduced when necessary. In this case, a control signal is generated from a synchronous signal during the reproduction.

For control means 4 (three-dimensional video generation means), the three-dimensional video generator of the second embodiment that generates a plurality of three-dimensional videos different in three-dimensionality from a smaller number of videos can be applied. In this case, the three-dimensional video generation means generates, for the videos without a caption and the videos with a caption, three or more videos that are different in parallax from video data smaller in number than these videos.

Figure 12:
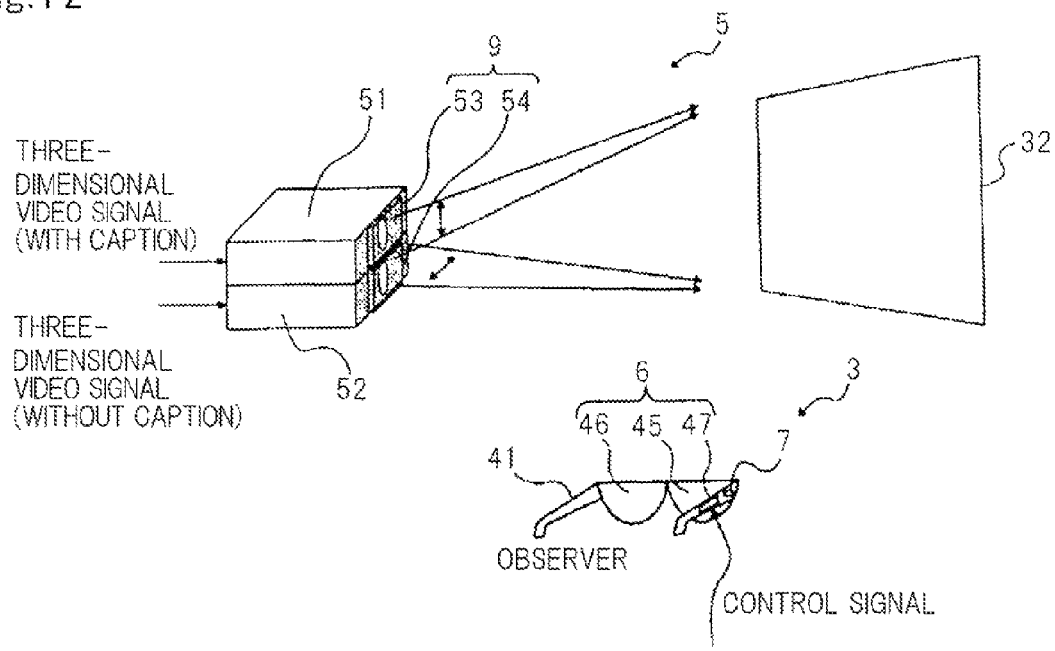
FIG. 12 A view showing a configuration of display means and an optical shutter in the three-dimensional video viewing system according to the fourth exemplary embodiment of the present invention.

FIG. 12 shows a specific configuration of display means 5 and optical shutter 3.

Display means 5 shown in FIG. 12 includes two projector 51 and 52, screen 32, and polarization plate 9. Polarization plate 9 includes vertical polarization plate 53 and horizontal polarization plate 54. Vertical polarization plate 53 and horizontal polarization plate 54 are located in light exit positions of two projectors 51 and 52. Projector 51 receives the three-dimensional video signal without a caption input from control means 4. Projector 52 receives the three-dimensional video signal with a caption input from control means 4.

Projector 51 time-sequentially projects, based on the three-dimensional video signal without a caption, right eye video R1, left eye video L1, and left eye video L2 having the three-dimensionality reduced to screen 32. A polarization direction of projection light in this case is vertical because of vertical polarization plate 53.

Projector 52 time-sequentially projects, based on the three-dimensional video signal with a caption, right eye video R2, left eye video L3, and left eye video L4 having the three-dimensionality reduced to screen 32. A polarization direction of projection light in this case is horizontal because of horizontal polarization plate 54.

In other words, the polarization direction of the three-dimensional video without a caption projected from projector 51 to screen 32 and the polarization direction of the three-dimensional video with a caption projected from projector 52 to screen 32 are orthogonal to each other.

The observer views the three-dimensional video through optical shutter 3 shown in FIG. 12. Optical shutter 3 includes shutter means 6 that includes right eye optical shutter 45, left eye optical shutter 46, and optical shutter driving circuit 47, and input means 7 for selecting a display mode. In the embodiment, optical shutter 3 is formed into the shape of eyeglasses, namely, three-dimensional eyeglasses 41.

Right eye optical shutter 45 and left eye optical shutter 46 include polarization switches for selecting polarized light on front faces of liquid crystal optical shutters. The liquid crystal optical shutter includes a liquid crystal cell in which a cell is formed by using two glass substrates on which transparent electrodes are formed and a liquid crystal is filled in a space between the glass substrates, a polarization plate being provided to the light entrance/exit surface of the liquid crystal cell. The liquid crystal optical shutter operates to transmit light when no voltage is applied to the transparent electrodes, and to block light when voltages are applied to the transparent electrodes. The polarization switch, which is configured such that the polarization plate of the liquid crystal optical shutter is not stuck, rotates a polarization direction of incident light by 90 degrees to transmit the light when no voltage is applied to the transparent electrodes, and transmits the incident light without changing its polarization direction when voltages are applied to the transparent electrodes.

Optical shutter driving circuit 47 selects, according to the display mode that the observer has selected by input means 7, polarized light to be transmitted, and determines opening/closing timings based on the control signal transmitted from control means 4, and independently controls opening/closing of right eye optical shutter 45 and left eye optical shutter 46.

Figure 13A:
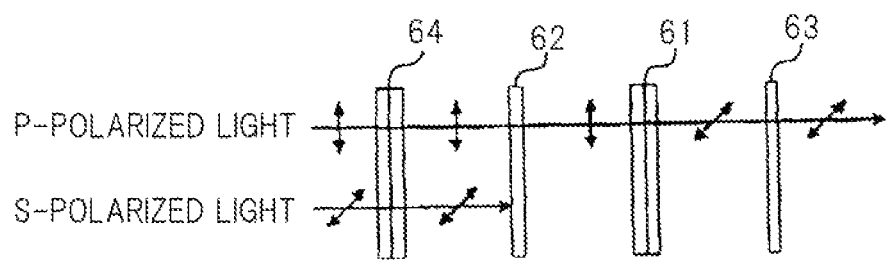
FIG. 13A A view showing a state of an optical shutter for a right eye and an optical shutter for a left eye in the three-dimensional video viewing system according to the fourth exemplary embodiment of the present invention.
Figure 13B:
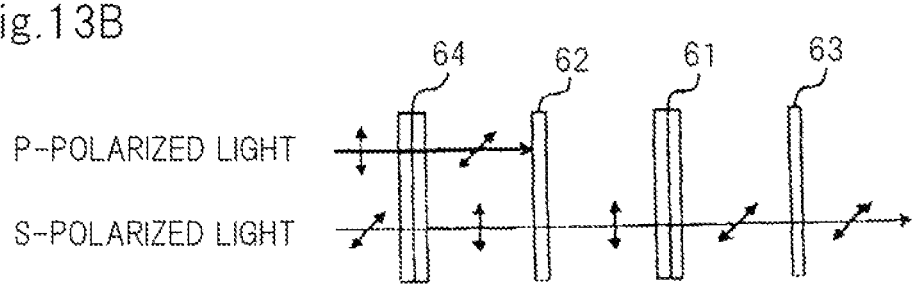
FIG. 13B A view showing another state of the optical shutter for the right eye and the optical shutter for the left eye in the three-dimensional video viewing system according to the fourth exemplary embodiment of the present invention.
Figure 13C:
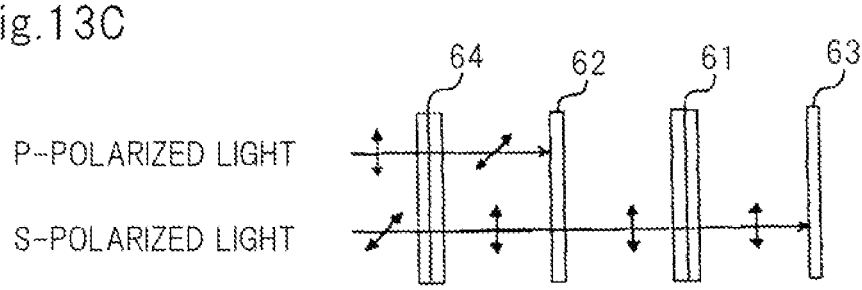
FIG. 13C A view showing yet another state of the optical shutter for the right eye and the optical shutter for the left eye in the three-dimensional video viewing system according to the fourth exemplary embodiment of the present invention.

Right eye optical shutter 45 and left eye optical shutter 46 are similar in configuration. FIGS. 13A, 13B, and 13C show configurations and operations of optical shutters used as right eye optical shutter 45 and left eye optical shutter 46.

In the optical shutter shown in each of FIGS. 13A, 13B, and 3C, liquid crystal cell 64, polarization plate 62, liquid crystal cell 61, and polarization plate 63 are arranged in order, and light enters from liquid crystal cell 64 side. For simplicity, a transparent electrode and a driving circuit for applying a voltage to the liquid crystal are shown.

Liquid crystal cell 64 operates as a polarization switch. Polarization plate 62, liquid crystal cell 61, and polarization plate 63 operate as liquid crystal optical shutters.

The optical shutter can switch three states, namely, a state where P-polarized light is transmitted while S-polarized light is blocked, a state where the P-polarized light is blocked while S-polarized light is transmitted, and a state where both P-polarized light and S-polarized light are blocked.

FIG. 13A schematically shows the state where P-polarized light is transmitted while S-polarized light is blocked. FIG. 13B schematically shows the state where P-polarized light is blocked while S-polarized light is transmitted. FIG. 13C schematically shows the state where both P-polarized light and S-polarized light are blocked.

Liquid crystal cells 61 and 64 rotate a polarization direction of incident light by 90 degrees to transmit the light when no voltage is applied to the transparent electrodes, and transmit the incident light without changing its polarization direction when voltages are applied to the transparent electrodes. Polarization plate 62 is located to transmit polarized light of a vertical direction, and polarization plate 63 is located to transmit polarized light of a horizontal direction.

In the state shown in FIG. 13A, a voltage is applied to liquid crystal cell 64 while no voltage is applied to liquid crystal cell 61. P-polarized light is transmitted through liquid crystal cell 64 while maintaining its polarized state, and hence light from liquid crystal cell 64 is transmitted through polarization plate 62. The light transmitted through polarization plate 62 is rotated for its polarization direction by 90 degrees at liquid crystal cell 61 to be transmitted through polarization plate 63. S-polarized light is also transmitted through liquid crystal cell 64 while maintaining its polarized state. However, light from liquid crystal cell 64 cannot be transmitted through polarization plate 62 because its polarization direction is orthogonal to the vertical direction, and is therefore blocked by polarization plate 62. Thus, the optical shutter is set in the state where P-polarized light is transmitted while S-polarized light is blocked.

In the state shown in FIG. 13B, no voltage is applied to liquid crystal cell 64 and liquid crystal cell 61. P-polarized light cannot be transmitted through polarization plate 62 because its polarization direction is rotated by 90 degrees at liquid crystal cell 64, and is therefore blocked by polarization plate 62. On the other hand, S-polarized light is transmitted through polarization plate 62 because its polarization direction is rotated by 90 degrees at liquid crystal cell 64. Light transmitted through polarization plate 62 is transmitted through polarization plate 63 because its polarization direction is rotated by 90 degrees at liquid crystal cell 61. Thus, the optical shutter is set in the state where P-polarized light is blocked while S-polarized light is transmitted.

In the state shown in FIG. 13C, a voltage is applied to liquid crystal cell 61 while no voltage is applied to liquid crystal cell 64. P-polarized light cannot be transmitted through polarization plate 62 because its polarization direction is rotated by 90 degrees at liquid crystal cell 64, and is therefore blocked by polarization plate 62. On the other hand, S-polarized light is transmitted through polarization plate 62 because its polarization direction is rotated by 90 degrees at liquid crystal cell 64. Light transmitted through polarization plate 62 is transmitted through liquid crystal cell 61 while maintaining its polarized state. Hence, the light cannot be transmitted through polarization plate 63, and is therefore blocked by polarization plate 63. Thus, the optical shutter is set in the state where both P-polarized light and S-polarized light are blocked.

The driving timing of the liquid crystal optical shutter for a display video in each display mode is similar to that shown in the timing chart of FIG. 6. Specifically, in right eye optical shutter 45 and left eye optical shutter 46, watching a video from projector 51 or watching a video from projector 52, in other words, watching a three-dimensional video without a caption or watching a three-dimensional video with a caption, is selected by the polarization switch. Simultaneously, in right eye optical shutter 45 and left eye optical shutter 46, watching a video at any timing, in other words, watching a normal three-dimensional display, watching a three-dimensional display having three-dimensionality reduced, and watching a two-dimensional image display, is selected by the liquid crystal optical shutter. Thus, based on a combination of these, the observer can view a video by appropriately selecting one of the six display modes, namely, two types of modes with a caption and without a caption corresponding to each of the three display modes, i.e., the normal three-dimensional display, the three-dimensional display having the three-dimensionality reduced, and the two-dimensional image display.

In the caption displaying mode, captions of a mother language can be displayed for foreign films, or conversation contents or audio information in domestic films can be displayed in captions of the mother language.

The embodiment provides a three-dimensional video viewing system that gives consideration to a universal design enabling the observer to view a video by appropriately selecting one of the six display modes, namely, two types of modes with a caption and without a caption corresponding to each of the three display modes, i.e., the normal three-dimensional display, the three-dimensional display having the three-dimensionality reduced, and the two-dimensional image display, and enabling much more people to view an easily viewable three-dimensional image.

In the embodiment, contents displayed by projector 52 are not limited to the caption display. Needless to say, three-dimensional videos different in three-dimensionality can be increased to be displayed.

As observation conditions other than the caption and the three-dimensionality, the following display mode can be performed.

For example, to those not good at or unaccustomed to three-dimensional viewing, a video in which a video scene having sudden motion is replaced with a video scene decreased in motion speed is displayed.

For children, a video in which a video scene having a light stimulus such as light flashing, a sudden cut change, or in which a stripe or spiral pattern having large luminance is replaced with another video scene is displayed.

Videos are displayed from different points of view while contents are similar.

Each display device (projector for displaying the video without a caption and projector for displaying the video with a caption) constituting display means 5 can include a shutter for switching a state where a displayed video is transmitted and a state where the displayed video is blocked. In this case, even without switching the video at a high speed to display it by the projector, which is performed in the third embodiments, effects similar to those of the first embodiment can be acquired.

In the abovementioned case, control means 4 generates or outputs, by controlling the video playback devices shown in FIG. 11 in synchronization, three or more video signals which constitute a three-dimensional video for the video without a caption and the video with a caption. For control means 4 (three-dimensional video generation means), the three-dimensional video generator of the second embodiment that generates a plurality of three-dimensional videos different in three-dimensionality from a smaller number of videos can be applied. In this case, the three-dimensional video generation means generates three or more videos that are different in parallax from video data smaller in number than these videos for the video without a caption and the video with a caption.

The three-dimensional video viewing system according to each embodiment described above is only an example of the present invention, and the configuration can be appropriately changed without departing from the spirit and scope of the invention. For example, the configurations of the embodiments can be combined.

In each embodiment, a plurality of optical shutters including input means, shutter means, and shutter driving circuits can be installed, and the control signal from the display means can be supplied to each optical shutter.

According to an aspect of the present invention, a three-dimensional video viewing system includes: a display system that multiplexes and displays, in a time-division manner, three or more videos that are different in parallax and that constitute a three-dimensional video, and outputs a control signal that indicates a switching timing of each video; input means for designating an arbitrary display mode among a plurality of display modes in which a plurality of three-dimensional videos different in three-dimensionality are defined by a combination of two of the three or more videos; two shutters that switch a state in which light is transmitted and a state in which light is blocked; and a shutter driving circuit that specifies switching timings of the two videos corresponding to the display mode designated by the input means based on the control signal, and that independently controls opening/closing of the two shutters based on the specified switching timings of the videos.

According to the three-dimensional video viewing system, the three or more videos different in parallax are multiplexed in the time-division manner to be displayed, and the opening/closing of the two shutters is controlled based on the switching timings of the two videos corresponding to the display mode designated by the observer, and a three-dimensional video including the two videos is supplied to the observer. In other words, the observer can designate a three-dimensional video having desired three-dimensionality among the three-dimensional videos different in three-dimensionality by designating the display mode. Thus, as in the case of a three-dimensional film, when a large audience simultaneously views the same three-dimensional video, each observer can set observation conditions of the three-dimensional video by designating the display mode, thereby suppressing visual fatigue. As a result, the same three-dimensional video can be simultaneously supplied to the large audience to be enjoyed and, at the same time, a three-dimensional video that is matched to the three-dimensional aptitude of individual viewers, and which varies from viewer to viewer can be supplied to reduce visual fatigue.

In the three-dimensional video viewing system, the input means can designate another display mode for performing two-dimensional displaying, and the shutter driving circuit can specify, when the input means designates the another display mode, a switching timing of one of the three or more videos based on the control signal, and simultaneously control the opening/closing of the two shutters based on the specified switching timing.

The input means can designate other display modes, and the shutter driving circuit can specify, when the input means designates the other display modes, a switching timing of one of the three or more videos based on the control signal, control opening/closing of one of the two shutters based on the specified switching timing, and close the other shutter.

The display system can include control means for outputting a three-dimensional video signal generated by multiplexing the three or more videos in a time-division manner, and display means for displaying a video based on the three-dimensional video signal. In this case, the control means can include three-dimensional video generation means for generating a three-dimensional video signal by multiplexing, in a time-division manner, three or more video signals different in parallax and constituting a three-dimensional video. The three-dimensional video generation means can include three or more video playback devices, and generates the three-dimensional video signal by controlling the video playback devices in synchronization. The three-dimensional video generation means an generate the three or more videos from video data smaller in number than the videos.

The display system can include control means for outputting three or more video signals that are different in parallax and that constitute a three-dimensional video, and a control signal that indicates frame switching timings of the video signals, three or more display devices which display videos based on the three-dimensional video signals from the control means, and a plurality of shutters which are installed in the three or more display devices, and which are configured to switch, according to the control signal from the control means, a state in which a displayed video is transmitted and a state in which the displayed video is blocked.

The control means can include three or more video playback devices, and output the three or more video signals by controlling the video playback devices in synchronization.

The control means can generate the three or more videos from video data smaller in number than the videos.

According to another aspect of the present invention, a three-dimensional video viewing system includes: a display system that multiplexes and displays, in a time-division manner, three or more videos that are different in parallax and that constitute a first three-dimensional video using first polarized light, that multiplexes, in a time-division manner, three or more videos that are different in parallax and that constitute a second three-dimensional video partially different in content from the first three-dimensional video to display the videos using second polarized light different in a polarization component from the first polarized light, and that outputs a control signal that indicates switching timings of the videos displayed by the first polarized light and the second polarized light; input means for designating, for the first and second three-dimensional videos, an arbitrary display mode among a plurality of display modes in which a plurality of three-dimensional videos different in three-dimensionality are defined by a combination of two of the three or more videos; two shutters that can select a polarization component of light to be transmitted, and switch a state in which light is transmitted and a state in which light is blocked; and a shutter driving circuit that specifies switching timings of the two videos corresponding to the display mode designated by the input means based on the control signal, that independently controls opening/closing of the two shutters based on the specified switching timings of the videos, and that selects the polarization components of the polarized light used for displaying the two videos corresponding to the designated display mode by the two shutters.

According to the three-dimensional video viewing system, for the first and second three-dimensional videos, the three or more videos different in parallax are multiplexed in the time-division manner to be displayed, and the opening/closing of the shutters is controlled based on the switching timings of the two videos corresponding to the display mode designated by the observer, and a three-dimensional video including the two videos is supplied to the observer. In other words, the observer can designate a three-dimensional video having desired three-dimensionality among the three-dimensional videos different in three-dimensionality by designating the display mode. Thus, as in the case of a three-dimensional film, when a large audience simultaneously views the same three-dimensional video, for the first and second three-dimensional videos, each observer can set observation conditions of the three-dimensional video by designating the display mode, thereby suppressing visual fatigue. As a result, the same three-dimensional video can be simultaneously supplied to the large audience to be enjoyed and, at the same time, a three-dimensional video that is matched to the three-dimensional aptitude of individual viewers, and which varies from viewer to viewer can be supplied to reduce visual fatigue. The first and second three-dimensional videos correspond to the three-dimensional video with a caption and the three-dimensional video without a caption according to the fourth) embodiment. The caption can be data information (including information indicating program contents or information such as an outline) in digital broadcasting.

In the three-dimensional video viewing system, the input means can designate, for the first and second three-dimensional videos, another display mode that performs two-dimensional displaying, and the shutter driving circuit can specify, for the first three-dimensional video, when the input means designates another display mode, a switching timing of one of the three or more videos constituting the first three-dimensional video based on the control signal, simultaneously control the opening/closing of the two shutters based on the specified switching timing, select the polarization component of the first polarized light by the two shutters, specify, for the second three-dimensional video, when the input means designates the another display mode, a switching timing of one of the three or more videos constituting the second three-dimensional video based on the control signal, simultaneously control the opening/closing of the two shutters based on the specified switching timing, and select the polarization component of the second polarized light by the two shutters.

The input means can designate, for the first and second three-dimensional videos, other display modes, and the shutter driving circuit can specify, for the first three-dimensional video, when the input means designates the other display modes, a switching timing of one of the three or more videos constituting the first three-dimensional video based on the control signal, control opening/closing of one of the two shutters based on the specified switching timing, select the polarization component of the first polarized light by one of the shutters, close the other shutter, specify, for the second three-dimensional video, when the input means designates the other display modes, a switching timing of one of the three or more videos constituting the second three-dimensional video based on the control signal, control opening/closing of one of the two shutters based on the specified switching timing, select the polarization component of the second polarized light by one of the shutters, and close the other shutter.

The display system can include control means for outputting a first three-dimensional video signal generated by multiplexing the three or more videos constituting the first three-dimensional video in a time-division manner and a second three-dimensional video signal generated by multiplexing the three or more videos constituting the second three-dimensional video, and display means for displaying a video based on the first three-dimensional video signal by the first polarized light, and a video based on the second three-dimensional video signal by the second polarized light.

The control means can include three-dimensional video generation means for generating the first three-dimensional video signal by multiplexing, in a time-division manner, three or more video signals that are different in parallax and that constitute the first three-dimensional video, and the second three-dimensional video signal by multiplexing, in a time-division manner, three or more video signals that are different in parallax and that constitute the second three-dimensional video. In this case, the three-dimensional video generation means can include three or more first video playback devices and three or more second video playback devices, and generate the first three-dimensional video signal by controlling the three or more first video playback devices in synchronization, and generates the second three-dimensional video signal by controlling the three or more second video playback devices in synchronization. The three-dimensional video generation means can generate the three or more videos that are different in parallax and that constitute the first three-dimensional video from video data smaller in number than the videos, and the three or more videos that are different in parallax and that constitute the second three-dimensional video from video data smaller in number than the videos.

The display system can include control means for outputting the three or more video signals that constitute the first three-dimensional video and the three or more video signals that it) constitute the second three-dimensional video, and a control signal that indicates frame switching timings of the video signals, three or more first display devices which display videos based on the three or more three-dimensional video signals that constitute the first three-dimensional video from the control means using the first polarized light, three or more second display devices which display videos based on the three or more three-dimensional video signals that constitute the second three-dimensional video from the control means using the second polarized light, and a plurality of shutters which are installed in the three or more first display devices and the three or more second display devices, and which are configured to switch, according to the control signal from the control means, a state in which a displayed video is transmitted and a state in which the displayed video is blocked.

The control means can include three or more first video playback devices and three or more second video playback devices, output the three or more video signals that constitute the first three-dimensional video by controlling the three or more first video playback devices in synchronization, and output the three or more video signals that constitute the second three-dimensional video by controlling the three or more second video playback devices in synchronization.

The control means can generate the three or more videos constituting the first three-dimensional video from video data smaller in number than the videos, and the three or more videos constituting the second three-dimensional video from video data smaller in number than the videos.

The three-dimensional video viewing system can further include a plurality of optical shutters each of which includes the input means, the two shutters, and the shutter driving circuit. In this case, the display system can supply the control signal to each optical shutter.

According to the present invention described above, the three or more videos that are different in parallax are multiplexed in the time-division manner to be displayed, and the opening/closing of the two shutters is controlled based on the switching timings of the two videos corresponding to the display mode designated by the observer, and a three-dimensional video including the two videos is supplied to the observer. In other words, the observer can designate a three-dimensional video having desired three-dimensionality among the three-dimensional videos different in three-dimensionality by designating the display mode. Thus, as in the case of a three-dimensional film, when a large audience simultaneously views the same three-dimensional video, each observer can set observation conditions of the three-dimensional video by designating the display mode, thereby suppressing visual fatigue. As a result, the same three-dimensional video can be simultaneously supplied to the large audience to be enjoyed and, at the same time, a three-dimensional video that is matched to the three-dimensional aptitude of individual viewers, and which varies from viewer to viewer can be supplied to reduce visual fatigue.

The embodiments of the present invention have been described. However, the present invention is not limited to the embodiments. Various changes understandable to those skilled in the art can be made to the configuration and the operation of the present invention without departing from the spirit and scope of the invention.

This application is the National Phase of PCT/JP2010/050526, filed Jan. 19, 2010, which claims priority from Japanese Patent Application No. 2009-012143 filed Jan. 22, 2009, which is hereby incorporated by reference herein in its entirety.

The invention claimed is:

1. A three-dimensional video viewing system comprising:
a display system that multiplexes and displays, in a time-division manner, three or more videos that are different in parallax and that constitute a three-dimensional video, and that outputs a control signal that indicates a switching timing of each video;
an input unit that designates an arbitrary display mode among a plurality of display modes in which a plurality of three-dimensional videos that are different in three-dimensionality are defined by a combination of two of the three or more videos including at least a video having a reduced three-dimensionality;
two shutters that switch a state in which light is transmitted and a state in which light is blocked; and
a shutter driving circuit that specifies switching timings of the two videos corresponding to the display mode designated by the input unit based on the control signal, and that independently controls opening/closing of the two shutters based on the specified switching timings of the videos,
wherein the two of the three or more videos, including at least the video having the reduced three-dimensionality, are combined to reduce viewing fatigue of a plurality of different users located at different positions relative to a display of the combination, while displaying a same combination to all the different users,
wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the display system includes:

a control unit that outputs a three-dimensional video signal generated by multiplexing the three or more videos in a time-division manner; and a display unit that displays a video based on the three-dimensional video signal, wherein the control unit includes a three-dimensional video generation unit that generates a three-dimensional video signal by multiplexing, in a time-division manner, three or more video signals that are different in parallax and that constitute a three-dimensional video, and wherein the three-dimensional video generation unit includes three or more video playback devices, and generates the three-dimensional video signal by controlling the video playback devices in synchronization.

2. The three-dimensional video viewing system according to claim 1, wherein:

the input unit can designate another display mode which performs two-dimensional displaying; and the shutter driving circuit specifies, when the input unit designates the another display mode, a switching timing of one of the three or more videos based on the control signal, and simultaneously controls the opening/closing of the two shutters based on the specified switching timing.

3. The three-dimensional video viewing system according to claim 1, wherein:

the input unit can designate other display modes; and the shutter driving circuit specifies, when the input unit designates the other display modes, a switching timing of one of the three or more videos based on the control signal, controls opening/closing of one of the two shutters based on the specified switching timing, and closes the other shutter.

4. The three-dimensional video viewing system according to claim 1, wherein the three-dimensional video generation unit generates the three or more videos from video data smaller in number than the videos.

5. The three-dimensional video viewing system according to claim 1, wherein the display system includes:

a control unit that outputs three or more video signals that are different in parallax and that constitute a three-dimensional video, and that outputs a control signal that indicates frame switching timings of the video signals;

three or more display devices that display videos based on the three-dimensional video signals from the control unit; and a plurality of shutters which are installed in the three or more display devices, and which are configured to switch, according to the control signal from the control unit, a state in which a displayed video is transmitted and a state in which the displayed video is blocked.

6. The three-dimensional video viewing system according to claim 5, wherein the control unit includes three or more video playback devices, and outputs the three or more video signals by controlling the video playback devices in synchronization.

7. The three-dimensional video viewing system according to claim 5, wherein the control unit generates the three or more videos from video data smaller in number than the videos.

8. A three-dimensional video viewing system comprising:

a display system that multiplexes and displays, in a time-division manner, three or more videos that are different in parallax and that constitute a first three-dimensional video using first polarized light, that multiplexes, in a time-division manner, three or more videos that are different in parallax and that constitute a second three-dimensional video having content that is partially different from the first three-dimensional video to display the videos using second polarized light having a polarization component from that of the first polarized light, and that outputs a control signal that indicates switching timings of the videos displayed by the first polarized light and the second polarized light, wherein the three or more videos of each of the first and second three-dimensional videos include at least a video having a reduced three-dimensionality;

an input unit that designates, for the first and second three-dimensional videos, an arbitrary display mode among a plurality of display modes in which a plurality of three-dimensional videos different in three-dimensionality are defined by a combination of two of the three or more videos including at least the video having the reduced three-dimensionality;

two shutters that can select a polarization component of light to be transmitted, and switch a state in which light is transmitted and a state in which light is blocked; and a shutter driving circuit that specifies switching timings of the two videos corresponding to the display mode designated by the input unit based on the control signal, independently controls opening/closing of the two shutters based on the specified switching timings of the videos, and selects the polarization components of the polarized light used for displaying the two videos corresponding to the designated display mode by the two shutters, wherein the two of the three or more videos, including at least the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the display system includes:

a control unit that outputs a first three-dimensional video signal generated by multiplexing the three or more videos that constitute the first three-dimensional video in a time-division manner and a second three-dimensional video signal generated by multiplexing the three or more videos that constitute the second three-dimensional video; and a display unit that displays a video based on the first three-dimensional video signal using the first polarized light, and that displays a video based on the second three-dimensional video signal using the second polarized light, wherein the control unit includes a three-dimensional video generation unit that generates the first three-dimensional video signal by multiplexing in a time-division manner, three or more video signals that are different in parallax and that constitute the first three-dimensional video, and that generates the second three-dimensional video signal by multiplexing, in a time-division manner, three or more video signals that are different in parallax and that constitute the second three-dimensional video, and wherein the three-dimensional video generation unit includes three or more first video playback devices and three or more second video playback devices, and generates the first three-dimensional video signal by controlling the three or more first video playback devices in synchronization, and generates the second three-dimensional video signal by controlling the three or more second video playback devices in synchronization.

9. The three-dimensional video viewing system according to claim 8, wherein:
the input unit can designate, for the first and second three-dimensional videos, another display mode that performs two-dimensional displaying; and
the shutter driving circuit specifies, for the first three-dimensional video, when the input unit designates the another display mode, a switching timing of one of the three or more videos that constitute the first three-dimensional video based on the control signal, simultaneously controls the opening/closing of the two shutters based on the specified switching timing, and selects the polarization component of the first polarized light by the two shutters; and,
specifies, for the second three-dimensional video, when the input unit designates the another display mode, a switching timing of one of the three or more videos constituting the second three-dimensional video based on the control signal, simultaneously controls the opening/closing of the two shutters based on the specified switching timing, and selects the polarization component of the second polarized light by the two shutters.

10. The three-dimensional video viewing system according to claim 8, wherein:
the input unit can designate, for the first and second three-dimensional videos, other display modes; and
the shutter driving circuit specifies, for the first three-dimensional video, when the input unit designates the other display modes, a switching timing of one of the three or more videos that constitute the first three-dimensional video based on the control signal, controls opening/closing of one of the two shutters based on the specified switching timing, selects the polarization component of the first polarized light by one of the shutters, and closes the other shutter; and
specifies, for the second three-dimensional video, when the input unit designates the other display modes, a switching timing of one of the three or more videos that constitute the second three-dimensional video based on the control signal, controls opening/closing of one of the two shutters based on the specified switching timing, selects the polarization component of the second polarized light by one of the shutters, and closes the other shutter.

11. The three-dimensional video viewing system according to claim 8, wherein the three-dimensional video generation unit generates the three or more videos that are different in parallax and that constitute the first three-dimensional video from video data smaller in number than the videos, and generates the three or more videos that are different in parallax and that constitute the second three-dimensional video from video data smaller in number than the videos.

12. The three-dimensional video viewing system according to claim 8,
wherein the display system includes:
a control unit that outputs the three or more video signals that constitute the first three-dimensional video and the three or more video signals that constitute the second three-dimensional video, and that outputs a control signal that indicates frame switching timings of the video signals;
three or more first display devices that display videos based on the three or more three-dimensional video signals that constitute the first three-dimensional video from the control unit using the first polarized light;
three or more second display devices that display videos based on the three or more three-dimensional video signals that constitute the second three-dimensional video from the control unit using the second polarized light; and
a plurality of shutters which are installed in the three or more first display devices and the three or more second display devices, and which are configured to switch, according to the control signal from the control unit, a state in which a displayed video is transmitted and a state in which the displayed video is blocked.

13. The three-dimensional video viewing system according to claim 12, wherein the control unit includes three or more first video playback devices and three or more second video playback devices, outputs the three or more video signals that constitute the first three-dimensional video by controlling the three or more first video playback devices in synchronization, and outputs the three or more video signals that constitute the second three-dimensional video by controlling the three or more second video playback devices in synchronization.

14. The three-dimensional video viewing system according to claim 12, wherein the control unit generates the three or more videos that constitute the first three-dimensional video from video data smaller in number than the videos, and generates the three or more videos that constitute the second three-dimensional video from video data smaller in number than the videos.

15. The three-dimensional video viewing system according to claim 1, further comprising a plurality of optical shutters each of which includes the input unit, the two shutters, and the shutter driving circuit,
wherein the display system supplies the control signal to each optical shutter.

16. A display system comprising:
a control unit that outputs a three-dimensional video signal generated by multiplexing three or more videos that are different in parallax and that constitute a three-dimensional video in a time-division manner, and that outputs a control signal that indicates frame switching of the three-dimensional video signal, wherein the three or more videos include at least a video having a reduced three-dimensionality; and
a display unit that displays a video based on the three-dimensional video signal from the control unit,
wherein, based on the control signal, a plurality of three-dimensional videos different in three-dimensionality are supplied to an external device by a combination of two of the three or more videos including at least the video having the reduced three-dimensionality,
wherein the two of the three or more videos, including at least the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the control unit includes a three-dimensional video generation unit that generates the three-dimensional video signal by multiplexing in a time-division manner, the three or more video signals that are different in parallax and that constitute the three-dimensional video, and wherein the three-dimensional video generation unit includes three or more first video playback devices, and generates the three-dimensional video signal by controlling the video playback device in synchronization.

17. The display system according to claim 16, wherein the three-dimensional video generation unit generates the three or more videos from video data smaller in number than the videos.

18. The display system according to claim 16,
wherein the display unit includes:
three or more first display devices that display the three or more videos based on the three-dimensional video signal from the control unit; and
a plurality of shutters which are installed in the three or more display devices, and which are configured to switch, according to the control signal from the control unit, a state in which a displayed video is transmitted and a state in which the displayed video is blocked.

19. A display system comprising:
a control unit that outputs a first three-dimensional video signal generated by multiplexing, in a time-division manner, three or more videos that are different in parallax and that constitute a first three-dimensional video and a second three-dimensional video signal generated by multiplexing, in a time-division manner, three or more videos that are different in parallax and that constitute a second three-dimensional video having content that is partially different from the first three-dimensional video, and that outputs a control signal that indicates frame switching timings of the three-dimensional video signals, wherein the three or more videos of each of the first and second three-dimensional video signals include at least a video having a reduced three-dimensionality; and
a display unit that displays a video based on the first three-dimensional video signal using first polarized light, and that displays a video based on the second three-dimensional video signal using second polarized light having a polarization component from that of the first polarized light,
wherein, based on the control signal, for each of the first and second three-dimensional videos, a plurality of three-dimensional videos different in three-dimensionality are supplied to an external device by a combination of two of the three or more videos that constitute the three-dimensional video, including at least the video having the reduced three-dimensionality,
wherein the two of the three or more videos, including at least the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the control unit includes a three-dimensional video generation unit that generates the first three-dimensional video signal by multiplexing, in a time-division manner, the three or more video signals that are different in parallax and that constitute the first three-dimensional video, and that generates the second three-dimensional video signal by multiplexing, in a time-division manner, the three or more video signals that are different in parallax and that constitute the second three-dimensional video, and wherein the three-dimensional video generation unit includes three or more first video playback devices and three or more second video playback devices, generates the first three-dimensional video signal by controlling the three or more first video playback devices in synchronization, and generates the second three-dimensional video signal by controlling the three or more second video playback devices in synchronization.

20. The display system according to claim 19, wherein the three-dimensional video generation unit generates the three or more videos that are different in parallax and that constitute the first three-dimensional video from video data smaller in number than the videos, and generates the three or more videos that are different in parallax and that constitute the second three-dimensional video from video data smaller in number than the videos.

21. A display system comprising:
a control unit that outputs three or more video signals that are different in parallax and that constitute a first three-dimensional video and three or more video signals that are different in parallax and that constitute a second three-dimensional video partially different in content from the first three-dimensional video, and that outputs a control signal that indicates frame switching timings of the video signals;
three or more first display devices that display videos based on the three or more three-dimensional video signals that constitute the first three-dimensional video from the control unit using first polarized light;
three or more second display devices that display videos based on the three or more three-dimensional video signals that constitute the second three-dimensional video from the control unit using second polarized light different in polarization component from the first polarized light; and
a plurality of shutters which are installed in the three or more first display devices and the three or more second display devices, and which are configured to switch, according to the control signal from the control unit, a state in which a displayed video is transmitted and a state in which the displayed video is blocked, wherein the plurality of shutters displays the video based on the three or more video signals that constitute the first three-dimensional video by multiplexing the video in a time-division manner, and displays the video based on the three or more video signals that constitute the second three-dimensional video by multiplexing the video in a time-division manner, wherein the video that is displayed is a combination of two of the three or more video signals, including a video signal having a reduced three-dimensionality, wherein the two of the three or more video signals, including the video signal having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the control unit includes three or more first video playback devices and three or more second video playback devices, outputs the three or more video signals that constitute the first three-dimensional video by controlling the three or more first video playback devices in synchronization, and outputs the three or more video signals that constitute the second three-dimensional video by controlling the three or more second video playback devices in synchronization.

22. The display system according to claim 21, wherein the control unit generates the three or more videos that constitute the first three-dimensional video from video data smaller in number than the videos, and generates the three or more videos that constitute the second three-dimensional video from video data smaller in number than the videos.

23. An optical shutter communicable with a display system that multiplexes and displays, in a time-division manner, three or more videos that are different in parallax and that constitute a three-dimensional video, and outputs a control signal that indicates a switching timing of each video, comprising;
an input unit that designates an arbitrary display mode among a plurality of display modes in which a plurality of three-dimensional videos different in three-dimensionality are defined by a combination of two of the three or more videos including at least a video having a reduced three-dimensionality;
two shutters that switch a state in which light is transmitted and a state in which light is blocked; and
a shutter driving circuit that specifies switching timings of the two videos corresponding to the display mode designated by the input unit based on the control signal, and that independently controls opening/closing of the two shutters based on the specified switching timings of the videos,
wherein the two of the three or more videos, including at least the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the display system includes:
a control unit that outputs a three-dimensional video signal generated by multiplexing the three or more videos in a time-division manner; and
a display unit that displays a video based on the three-dimensional video signal,
wherein the control unit includes a three-dimensional video generation unit that generates a three-dimensional video signal b multiplexing, in a time-division manner, three or more video signals that are different in parallax and that constitute a three-dimensional video,
and wherein the three-dimensional video generation unit includes three or more video playback devices, and generates the three-dimensional video signal by controlling the video playback devices in synchronization.

24. The optical shutter according to claim 23, wherein:
the input unit can designate another display mode that performs two-dimensional displaying; and
the shutter driving circuit specifies, when the input unit designates the another display mode, a switching timing of one of the three or more videos based on the control signal, and simultaneously controls the opening/closing of the two shutters based on the specified switching timing.

25. The optical shutter according to claim 23, wherein:
the input unit can designate other display modes; and
the shutter driving circuit specifies, when the input unit designates the other display modes, a switching timing of one of the three or more videos based on the control signal, and controls opening/closing of one of the two shutters based on the specified switching timing, and closes the other shutter.

26. An optical shutter communicable with a display system that multiplexes and displays, in a time-division manner, three or more videos that are different in parallax and that constitute a first three-dimensional video using first polarized light, that multiplexes, in a time-division manner, three or more videos that are different in parallax and that constitute a second three-dimensional video partially different in content from the first three-dimensional video to display the videos using second polarized light different in polarization component from the first polarized light, and that outputs a control signal indicating switching timings of the videos displayed by the first polarized light and the second polarized light, comprising;
an input unit that designates, for the first and second three-dimensional videos, an arbitrary display mode among a plurality of display modes in which a plurality of three-dimensional videos different in three-dimensionality are defined by a combination of two of the three or more videos including at least a video having a reduced three-dimensionality;
two shutters that can select a polarization component of light to be transmitted, and switch a state in which light is transmitted and a state in which light is blocked; and
a shutter driving circuit that specifies switching timings of the two videos corresponding to the display mode designated by the input unit based on the control signal, that independently controls opening/closing of the two shutters based on the specified switching timings of the videos, and that selects the polarization components of the polarized light used for displaying the two videos corresponding to the designated display mode by the two shutters, wherein the two of the three or more videos, including at least the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the display system includes:

a control unit that outputs a three-dimensional video signal generated by multiplexing the three or more videos in a time-division manner; and a display unit that displays a video based on the three-dimensional video signal, wherein the control unit includes a three-dimensional video generation unit that generates a three-dimensional video signal by multiplexing, in a time-division manner, three or more video signals that are different in parallax and that constitute a three-dimensional video, and wherein the three-dimensional video generation unit includes three or more video playback devices, and generates the three-dimensional video signal by controlling the video playback devices in synchronization.

27. The optical shutter according to claim 26, wherein:

the input unit can designate, for the first and second three-dimensional videos, another display mode that performs two-dimensional displaying; and the shutter driving circuit specifies, for the first three-dimensional video, when the input unit designates the another display mode, a switching timing of one of the three or more videos that constitute the first three-dimensional video based on the control signal, simultaneously controls the opening/closing of the two shutters based on the specified switching timing, and selects the polarization component of the first polarized light by the two shutters; and, specifies, for the second three-dimensional video, when the input unit designates the another display mode, a switching timing of one of the three or more videos that constitute the second three-dimensional video based on the control signal, simultaneously controls the opening/closing of the two shutters based on the specified switching timing, and selects the polarization component of the second polarized light by the two shutters.

28. The optical shutter according to claim 26, wherein:

the input unit can designate, for the first and second three-dimensional videos, other display modes; and the shutter driving circuit specifies, for the first three-dimensional video, when the input unit designates the other display modes, a switching timing of one of the three or more videos that constitute the first three-dimensional video based on the control signal, controls opening/closing of one of the two shutters based on the specified switching timing, selects the polarization component of the first polarized light by one of the shutters, and closes the other shutter; and specifies, for the second three-dimensional video, when the input unit designates the other display modes, a switching timing of one of the three or more videos that constitute the second three-dimensional video based on the control signal, controls opening/closing of one of the two shutters based on the specified switching timing, selects the polarization component of the second polarized light by one of the shutters, and closes the other shutter.

29. A three-dimensional video viewing method of multiplexing and displaying, in a time-division manner, three or more videos that are different in parallax and that constitute a three-dimensional video in a display system, and of observing the displayed videos via two shutters that switch a state in which light is transmitted and a state in which light is blocked, comprising:

receiving a control signal that indicates switching timings of the three or more videos from the display system; and specifying, when a display mode is designated among a plurality of display modes in which a plurality of three-dimensional videos different in three-dimensionality are defined by a combination of two of the three or more videos, switching timings of the two videos corresponding to the designated display mode based on the control signal, and independently controlling opening/closing of the two shutters based on the specified switching timings of the videos, wherein a video that is displayed is a combination of two of the three or more videos, including a video having a reduced three-dimensionality, wherein the two of the three or more videos, including the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the display system includes:

a control unit that outputs a three-dimensional video signal generated by multiplexing the three or more videos in a time-division manner; and a display unit that displays a video based on the three-dimensional video signal, wherein the control unit includes a three-dimensional video generation unit that generates a three-dimensional video signal by multiplexing, in a time-division manner, three or more video signals that are different in parallax and that constitute a three-dimensional video, and wherein the three-dimensional video generation unit includes three or more video playback devices, and generates the three-dimensional video signal by controlling the video playback devices in synchronization.

30. A three-dimensional video viewing method of multiplexing and displaying, in a time-division manner, three or more videos that are different in parallax and that constitute a first three-dimensional video by first polarized light in a display system, of multiplexing, in a time-division manner, three or more videos that are different in parallax and that constitute a second three-dimensional video having a content that is partially different from the first three-dimensional video to display the videos by second polarized light having a polarization component that is different from that of the first polarized light, and of observing the displayed videos via two shutters that switch a state in which light is transmitted and a state in which light is blocked, comprising:

receiving a control signal that indicates switching timings of the videos displayed by the first polarized light and the second polarized light; and specifying, for the first and second three-dimensional videos, when a display mode is designated among a plurality of display modes in which a plurality of three-dimensional videos different in three-dimensionality are defined by a combination of two of the three or more videos including at least a video having a reduced three-dimensionality, switching timings of the two videos corresponding to the designated display mode based on the control signal, independently controlling opening/closing of the two shutters based on the specified switching timings of the videos, and selecting the polarization components of the polarized light used for displaying the two videos corresponding to the designated display mode by the two shutters, wherein the two of the three or more videos, including at least the video having the reduced three-dimensionality, are combined to reduce viewing fatigue of a plurality of different users located at different positions relative to a display of the combination, while displaying a same combination to all the different users, wherein the display system permits a viewer to select from a first three-dimensional video adapted for viewing by multiple viewers, a second three-dimensional video with the reduced three-dimensionality adapted to a particular viewer and not for viewing by the multiple viewers to reduce viewing fatigue by the particular viewer, and a two-dimensional video, wherein a parallax amount of the second three-dimensional video is smaller than a parallax amount of the first three-dimensional video, wherein the display system includes:

a control unit that outputs a three-dimensional video signal generated by multiplexing the three or more videos in a time-division manner; and a display unit that displays a video based on the three-dimensional video signal, wherein the control unit includes a three-dimensional video generation unit that generates a three-dimensional video signal by multiplexing, in a time-division manner, three or more video signals that are different in parallax and that constitute a three-dimensional video, and wherein the three-dimensional video generation unit includes three or more video playback devices, and generates the three-dimensional video signal by controlling the video plalback devices in synchronization.

31. The three-dimensional video viewing system according to claim 8, further comprising a plurality of optical shutters each of which includes the input unit, the two shutters, and the shutter driving circuit, wherein the display system supplies the control signal to each optical shutter.

* * * * *